US012122272B2

(12) United States Patent
Jing

(10) Patent No.: US 12,122,272 B2
(45) Date of Patent: Oct. 22, 2024

(54) SEAT SUSPENSION UTILIZING NONLINEAR STIFFNESS DESIGN

(71) Applicant: City University of Hong Kong, Kowloon (HK)

(72) Inventor: Xingjian Jing, Shatin (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 242 days.

(21) Appl. No.: 17/931,244

(22) Filed: Sep. 12, 2022

(65) Prior Publication Data
US 2024/0092239 A1  Mar. 21, 2024

(51) Int. Cl.
*B60N 2/50* (2006.01)
*B60N 2/02* (2006.01)
(Continued)

(52) U.S. Cl.
CPC .......... *B60N 2/501* (2013.01); *B60N 2/0244* (2013.01); *B60N 2/502* (2013.01); *B60N 2/522* (2013.01); *B60N 2/544* (2013.01); *F16M 11/06* (2013.01)

(58) Field of Classification Search
CPC ........ B60N 2/501; B60N 2/502; B60N 2/504; B60N 2/505; B60N 2/506; B60N 2/507;
(Continued)

(56) References Cited

U.S. PATENT DOCUMENTS 3,075,736 A  *  1/1963  Freedman ................ B60N 2/06
248/419
5,794,911 A  *  8/1998  Hill .......................... B60N 2/544
248/419
(Continued)

FOREIGN PATENT DOCUMENTS

DE  102014009496 A1  *  12/2015  ............ B60N 2/502
EP  0787621 A2  *  8/1997
EP  0873905 A2  *  10/1998

OTHER PUBLICATIONS

Burstrom et al., "Whole-body vibration and the risk of low back pain and sciatica: a systematic review and meta-analysis" Int Arch Occup Environ Health. 2015;88(4):403-418. 16 pages.
(Continued)

*Primary Examiner* — Tan Le
(74) *Attorney, Agent, or Firm* — Amin, Turocy & Watson, LLP

(57) ABSTRACT

A suspension system with vibration isolation is described. The system can incorporate a kinematic structure comprising pairs of X-shaped supporting structures connected in parallel. The kinematic structure limits motion in the vertical direction to a single degree of freedom. Tensioning/damping of the kinematic structure orthogonally to the vertical motion limits horizontal motion of the kinematic structure with a corresponding constraint of motion of in the vertical direction. The tensioning/damping imparts passive nonlinear stiffness and nonlinear damping of the vibrational energies across the suspension system. A tuning mechanism can be incorporated enabling tension/damping adjustment to accommodate different heights and payloads. The system can provide vibration isolation at low frequencies and over a wide range of operational frequencies. The suspension system has tunable ultra-low resonant frequencies with anti-resonance characteristics. In an example application, the suspension system can be incorporated into a seat for applications experiencing whole body vibrations.

20 Claims, 27 Drawing Sheets

(51) Int. Cl.
  *B60N 2/52* (2006.01)
  *B60N 2/54* (2006.01)
  *F16M 11/06* (2006.01)
(58) Field of Classification Search
  CPC ...... B60N 2/508; B60N 2/0244; B60N 2/522;
      B60N 2/50; B60N 2/54; B60N 2/544;
      F16F 15/065; F16F 15/022; F16F 15/04;
      F16F 15/08; F16F 15/067; F16M 11/22;
      F16M 11/06
  See application file for complete search history.

(56) References Cited

U.S. PATENT DOCUMENTS

| | | | | |
|---|---|---|---|---|
| 5,799,922 | A * | 9/1998 | Timms | B60N 2/502 |
| | | | | 248/564 |
| 7,571,886 | B2 * | 8/2009 | Carter | B60N 2/544 |
| | | | | 248/419 |

OTHER PUBLICATIONS

European Union. Directive 2002/44/EC of the European Parliament and of the Council of Jun. 25, 2002 'on the minimum health and safety requirements regarding the exposure of workers to the risks arising from physical agents '(vibration)'. OJL; 2002. 177.
Cao et al., "Roll- and pitch-plane coupled hydro-pneumatic suspension. Part 1: feasibility analysis and suspension properties" Veh Syst Dyn. 2010;48(3):361-386. 27 pages.
Uys et al., "Suspension settings for optimal ride comfort of off-road vehicles travelling on roads with different roughness and speeds" J Terramechanics. 2007;44(2):163-175. 27 pages.
Pazooki et al., "Modeling and validation of off-road vehicle ride dynamics" Mech Syst Signal Process. 2012;28:679-695. 17 pages.
Rakheja et al., "Performance analysis of suspension seats under high magnitude vibration excitations: part 1: model development and vibration" J Low Freq Noise Vib Act Control. 2003;22(4):225-252. 19 pages.
Ma et al., "Damping requirement of a suspension seat subject to low frequency vehicle vibration and shock" Int J Veh Des. 2008;47(1-4):133-156. 24 pages.
Dong et al., "Analysis and evaluation of an anti-shock seat with a multi-stage non-linear suspension for a tactical vehicle under a blast load" Proc Inst Mech. Eng D, J Automob. Eng..2012;226(8):1037-1047. 4 pages.
Rakheja et al., "Performance analysis of suspension seats under high magnitude vibration excitations part II: design parameter study" J Low Freq Noise Vib Act Control. 2004;23(1):7-25. 19 pages.

Cation et al., "Six degree of freedom whole-body vibration during forestry skidder operations" Int J Ind Ergon. 2008;38(9-10):739-757. 19 pages.
Wegscheid "Another look at skidder ride vibration" J Forest Eng. 1994;5(2):21-32. 12 pages.
Blood et al., "Whole body vibration exposures in forklift operators: comparison of a mechanical and air suspension seat" Ergonomics. 2010;53(11):1385-1394. 12 pages.
Zhao et al., "Vibration control of seat suspension using H∞ reliable control." J Vib Control 2010; 16(12):1859-1879. 21 pages.
Burdorf et al., "The effect of seat suspension on exposure to whole-body vibration of professional drivers" Annals of Occupational Hygiene. 1993;37(1):45-55. 8 pages.
Hostens et al., "An improved design of air suspension for seats of mobile agricultural machines" J Sound Vib. 2004;276(1-2):141-156. 16 pages.
Holtz et al., "Modelling and design of a novel air-spring for a suspension seat" J Sound Vib. 2010;329(21):4354-4366. 13 pages.
Maciejewski et al., "Application of the pareto-optimal approach for selecting dynamic characteristics of seat suspension systems" Veh Syst Dyn. 2011;49(12): 1929-1950. 23 pages.
Stein et al., "A study of locomotive driver's seat vertical suspension system with adjustable damper" Veh Syst Dyn. 2009;47(3):363-386. 25 pages.
Gohari et al., "Off-road vehicle seat suspension optimisation, part I: derivation of an artificial neural network model to predict seated human spine acceleration in vertical vibration" J Low Freq Noise Vib Act Control. 2014;33(4):429-442. 13 pages.
Duke et al., "Investigation of tractor driver seat performance with non-linear stiffness and on-off damper" Biosyst Eng. 2007;96(4):477-486. 10 pages.
Wu et al., "A semi-active control policy to reduce the occurrence and severity of end-stop impacts in a suspension seat with an electrorheological fluid damper" J Sound Vib. 1997;203(5):781-793. 13 pages.
McManus et al., "Evaluation of vibration and shock attenuation performance of a suspension seat with a semi-active magnetorheological fluid damper" J Sound Vib. 2002;253(1):313-327. 15 pages.
Hiemenz et al., "Adaptive magnetorheological seat suspension for the expeditionary fighting vehicle" J Phys. 2009;149:012054. 5 pages.
Liang et al., "A study on biodynamic models of seated human subjects exposed to vertical vibration" Int J Ind Ergon. 2006;36(10):869-890. 22 pages.
Abbas et al., "Optimal seat and suspension design for a half-car with driver model using genetic algorithm" Intell Control Autom. 2013;4(2):199-205. 7 pages.
Politis et al., "Limits of application of human body dynamics in assessing vibration comfort of seats" SAE Trans J Passenger Cars. 2003;112(6):973-979. 8 pages.

* cited by examiner

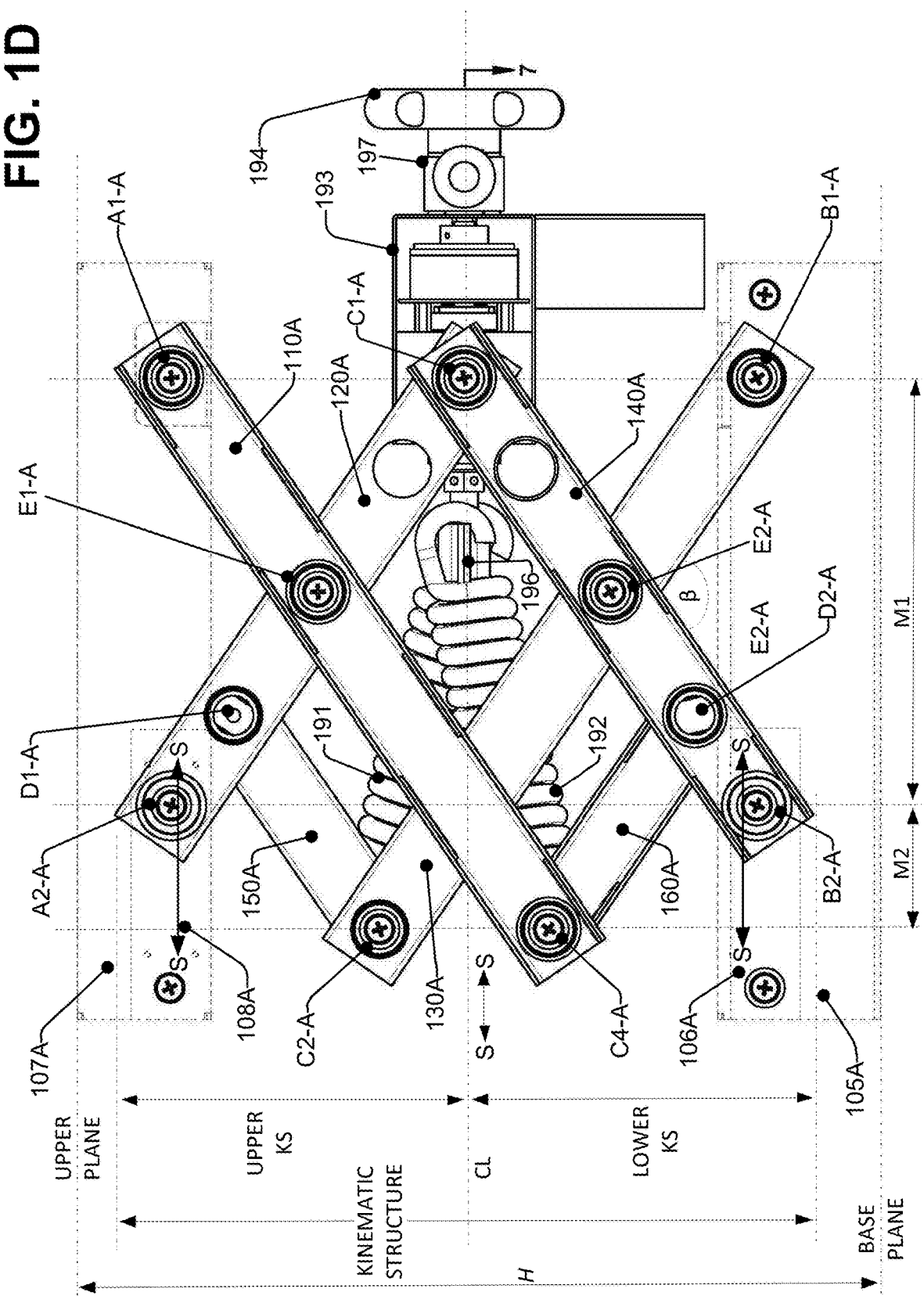

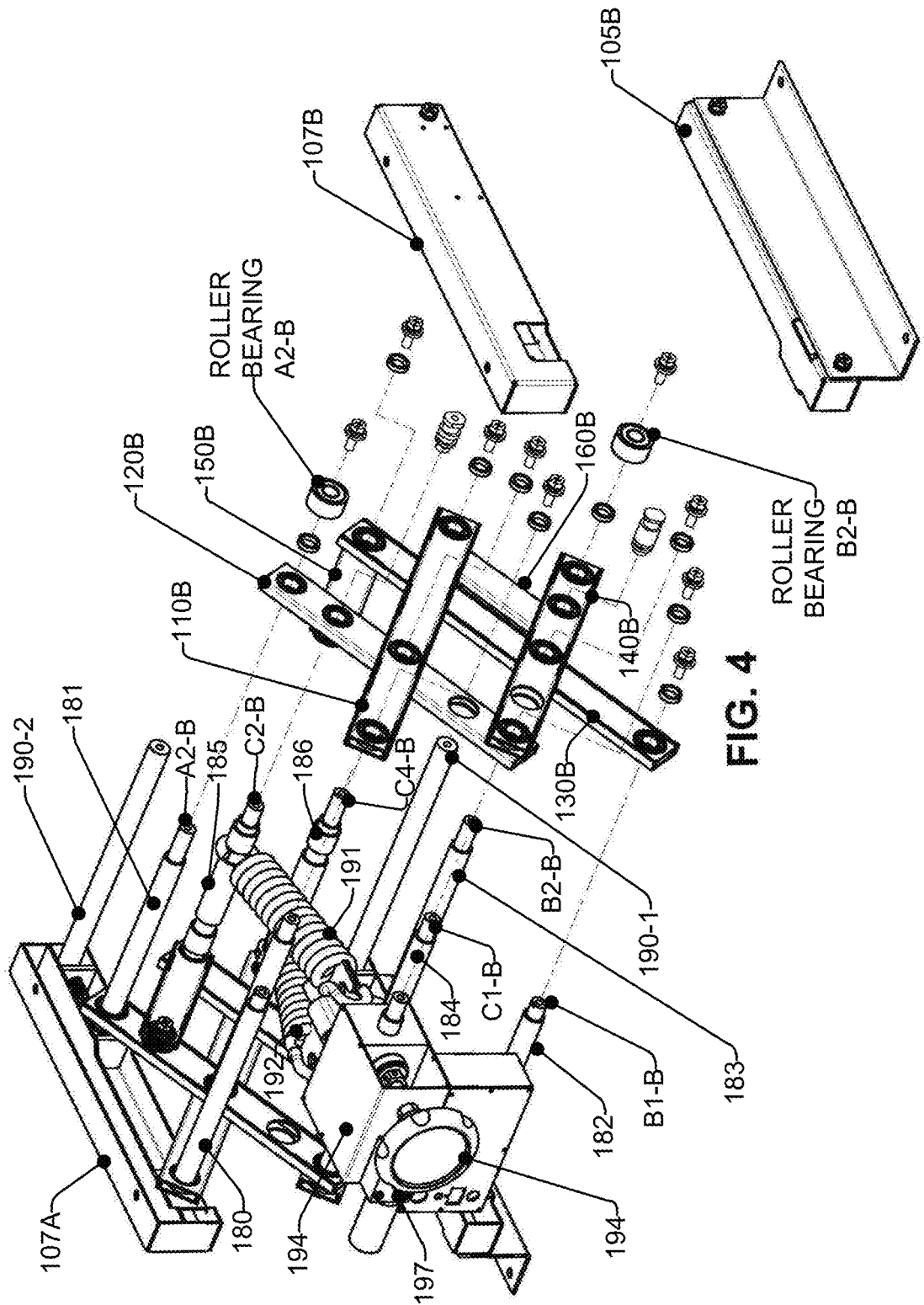

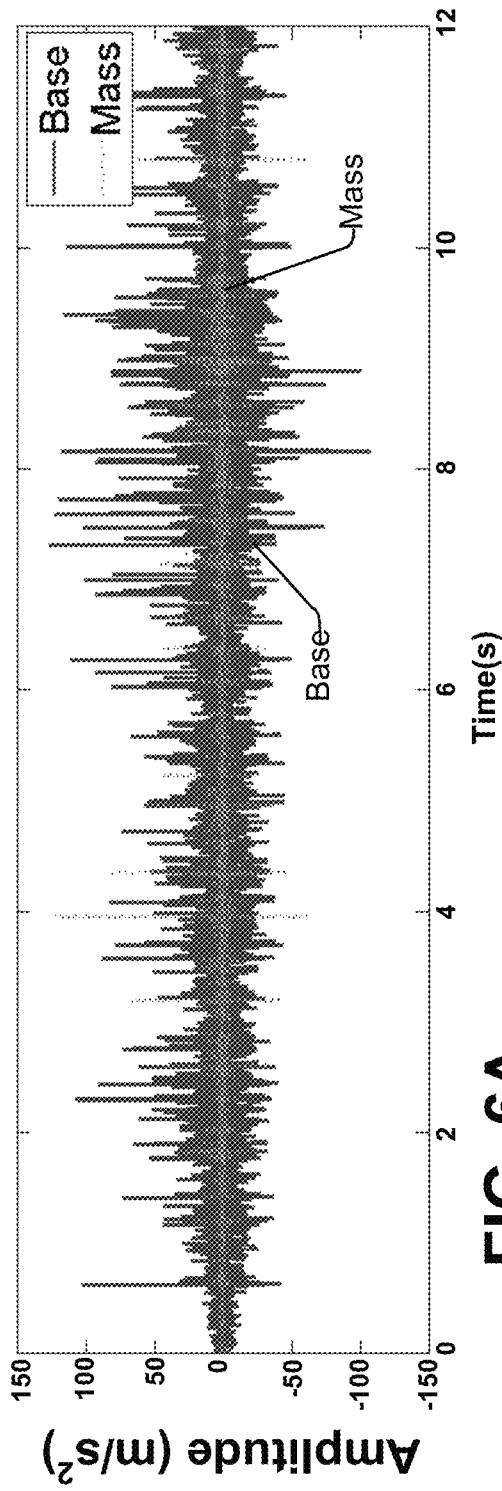
FIG. 6A
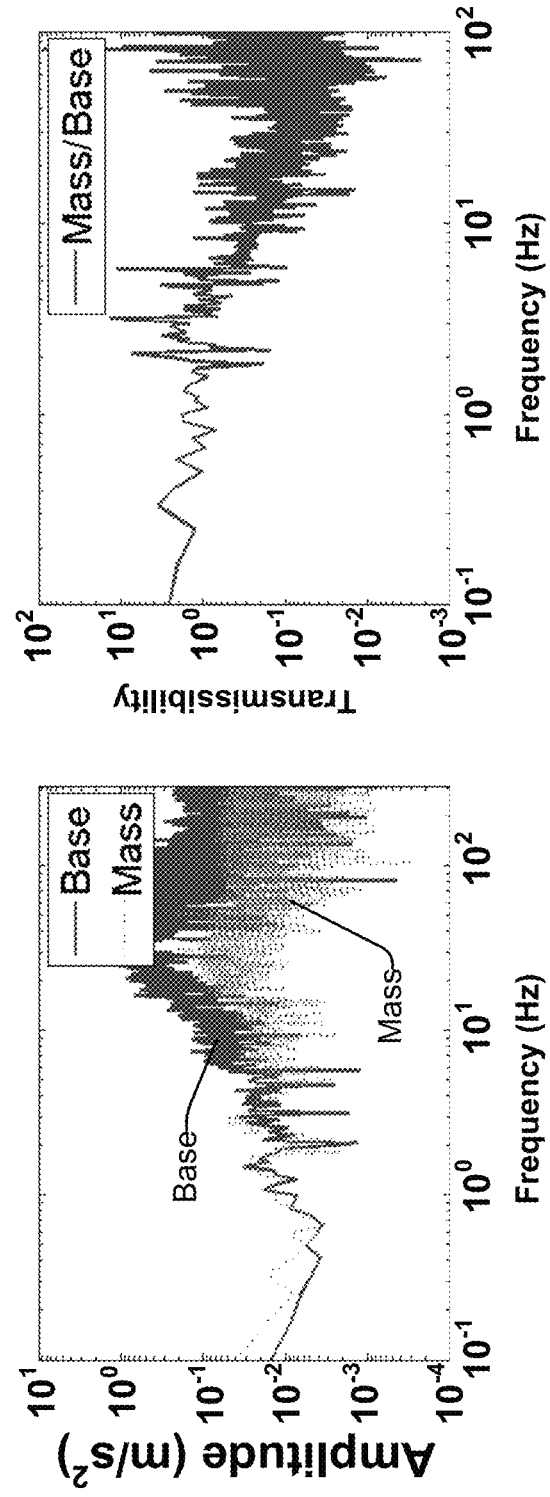
FIG. 6B
FIG. 6C

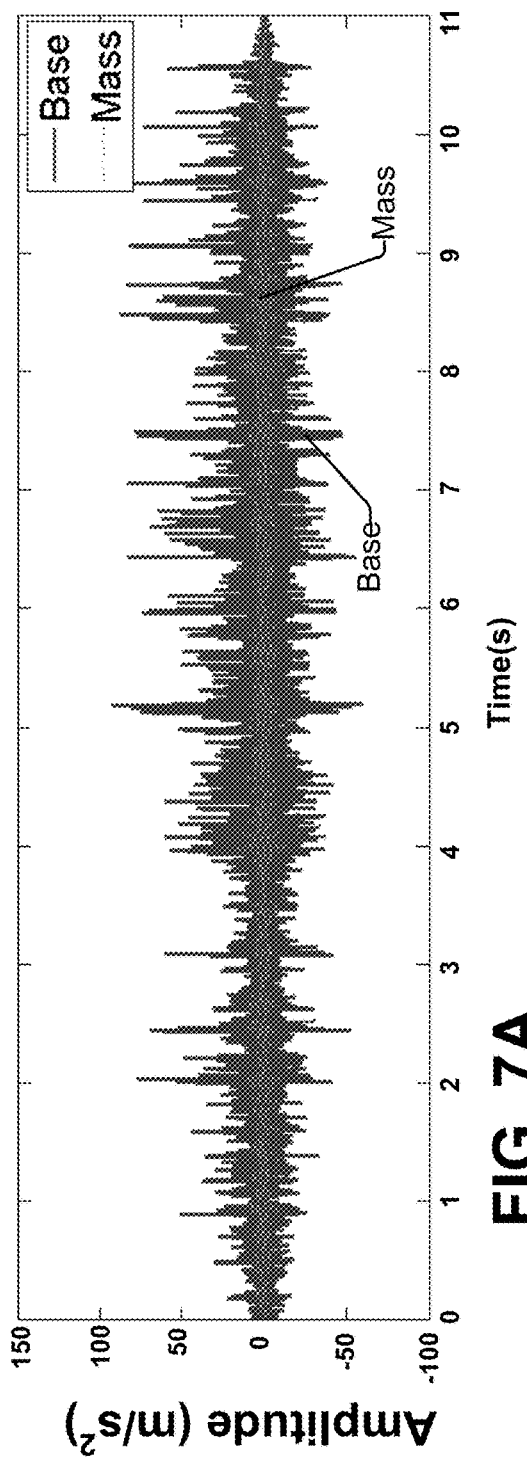
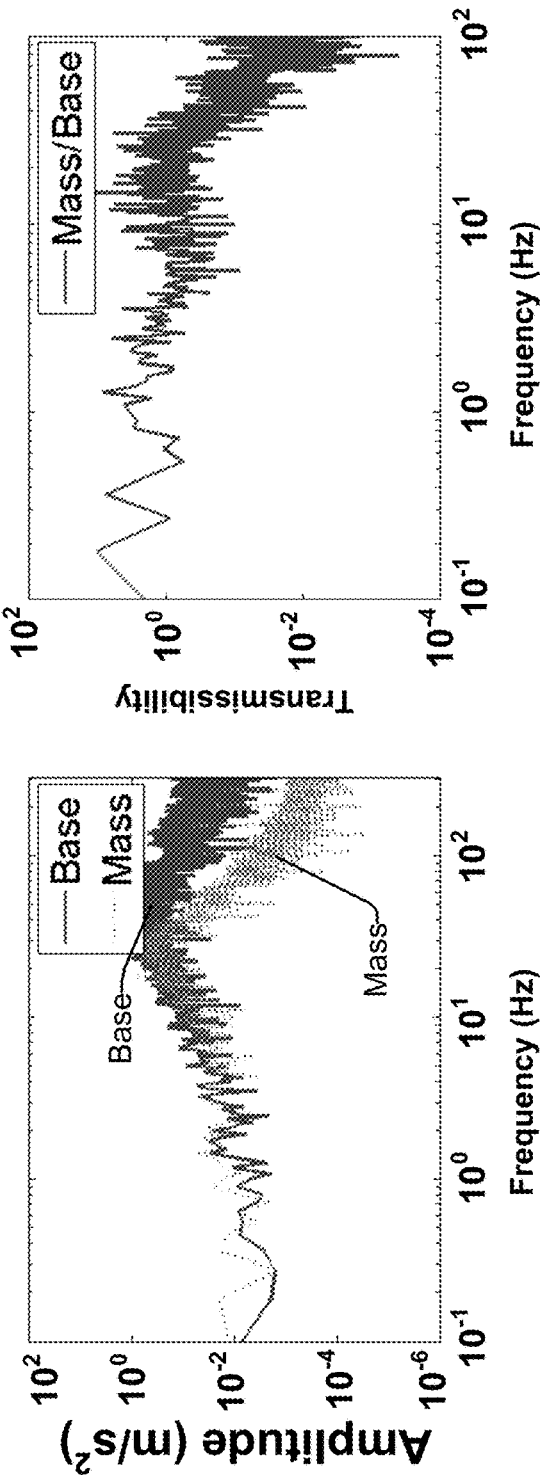
FIG. 7A
FIG. 7B
FIG. 7C

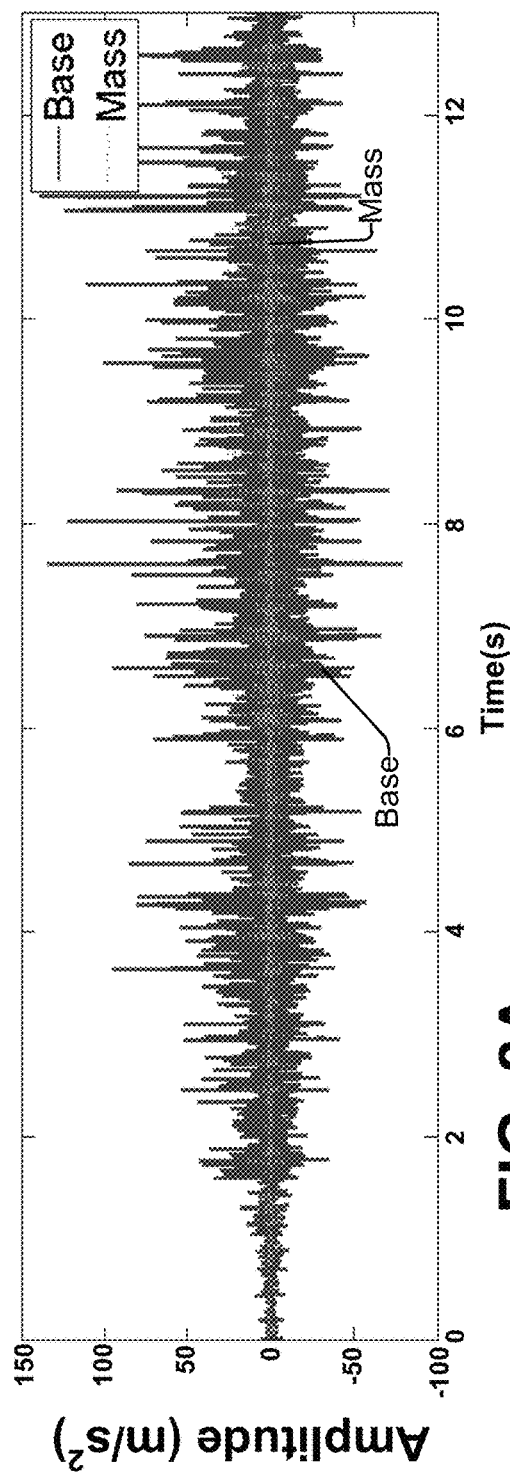
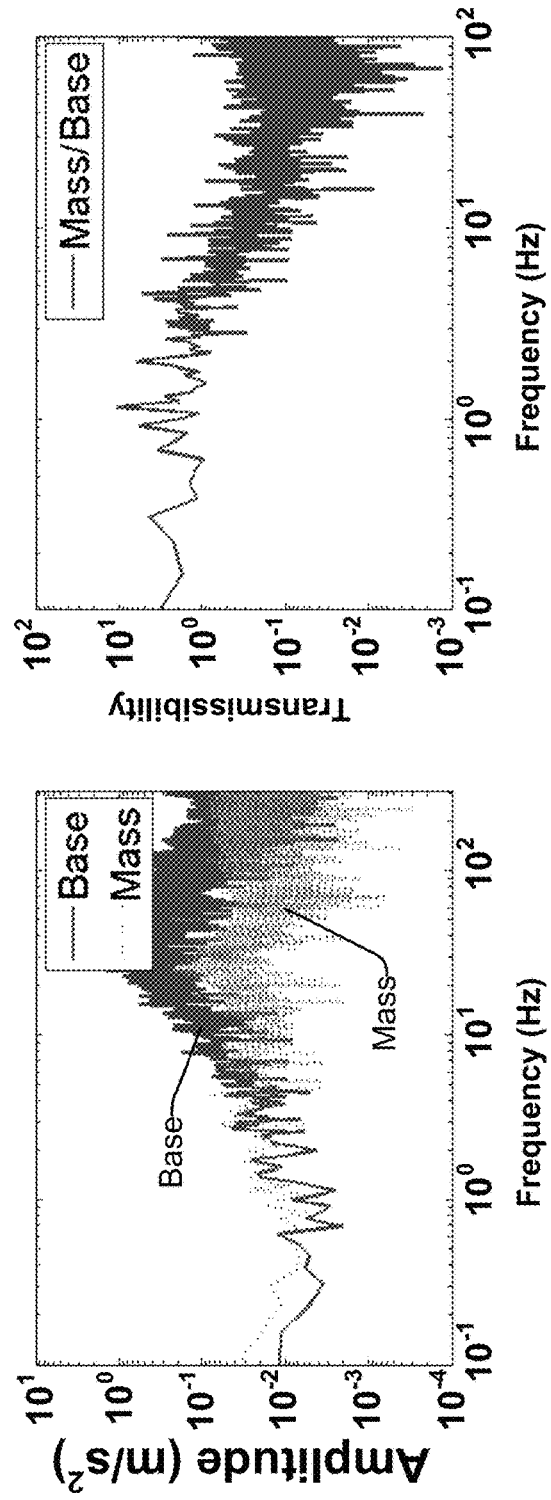
FIG. 8A
FIG. 8B
FIG. 8C

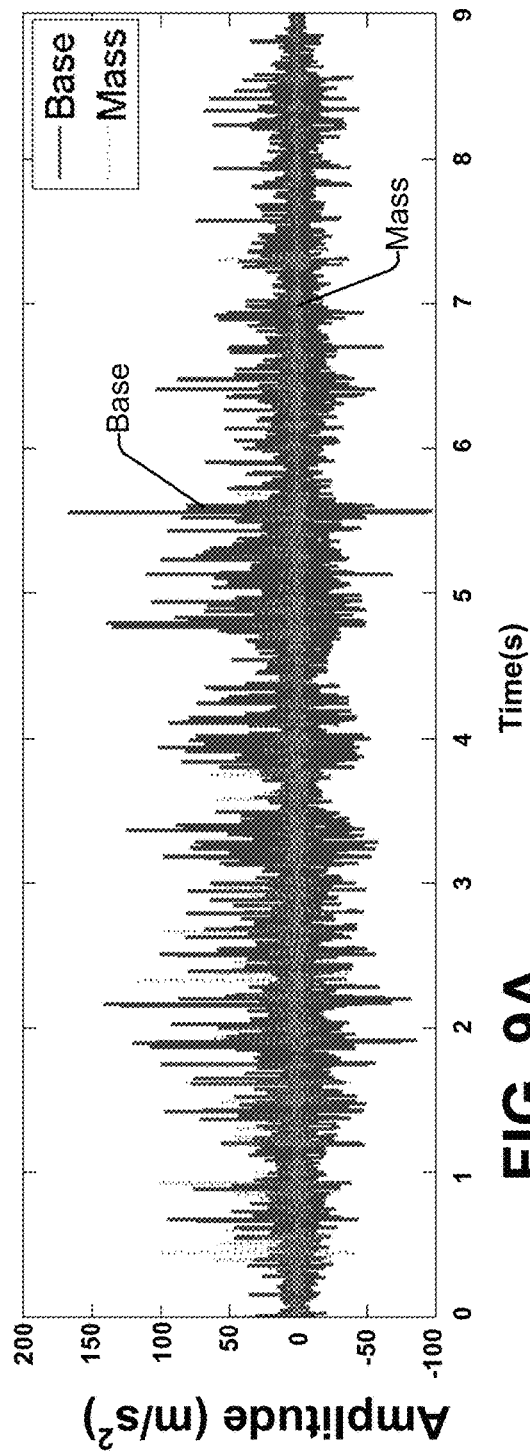
FIG. 9A
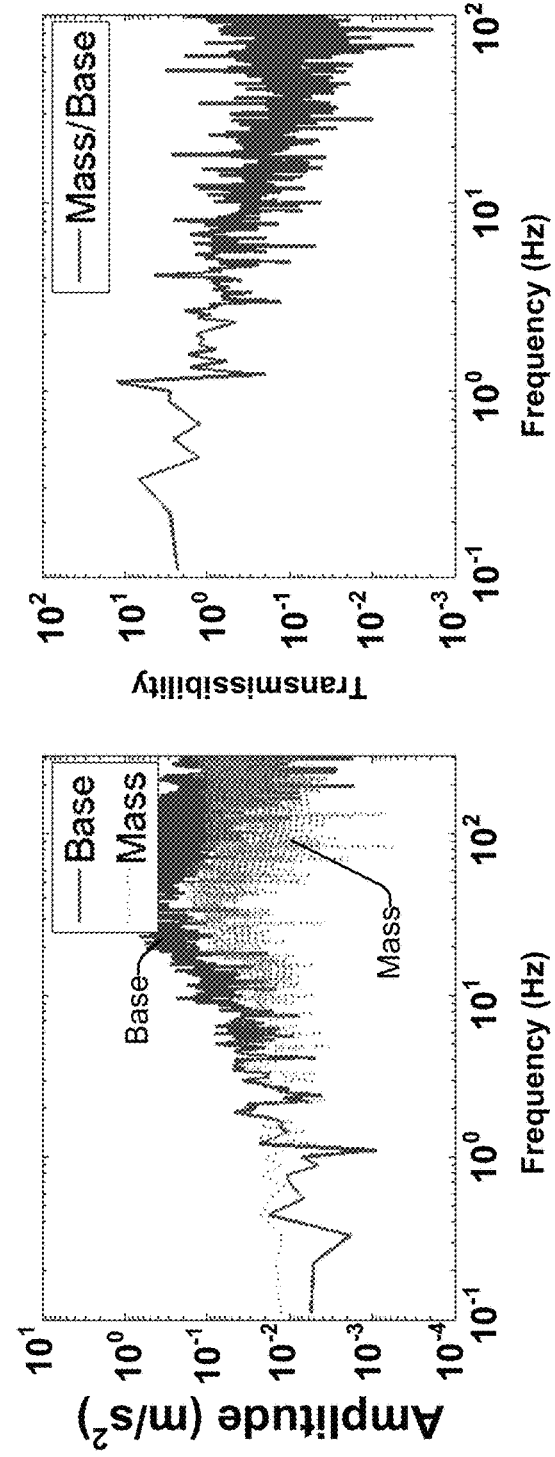
FIG. 9B
FIG. 9C

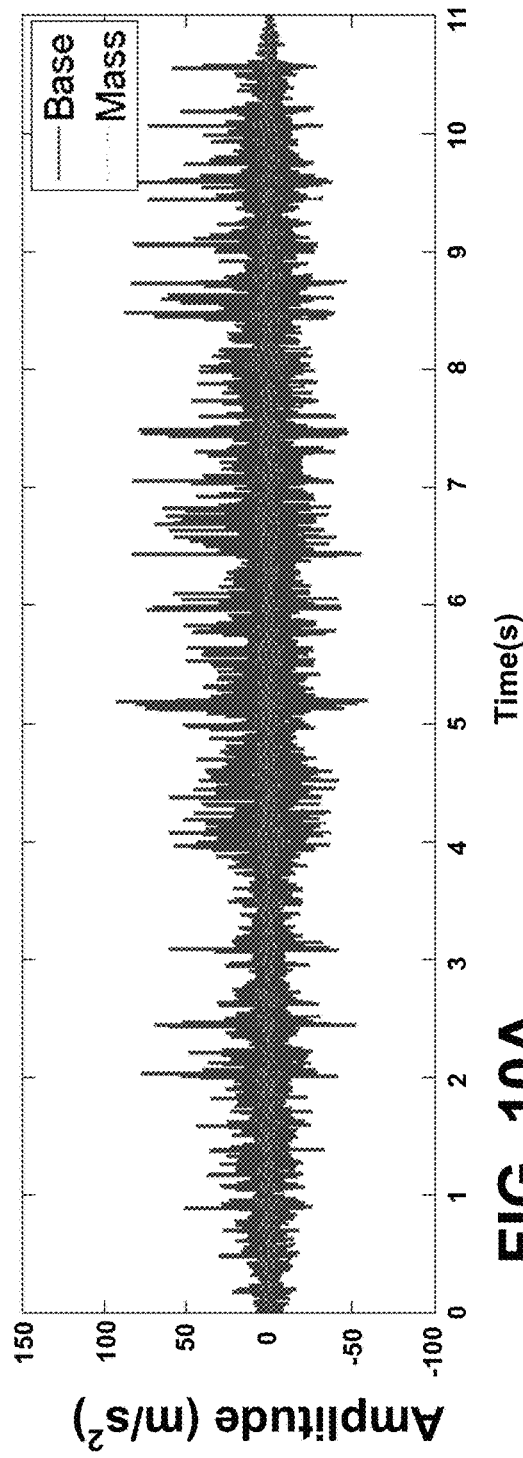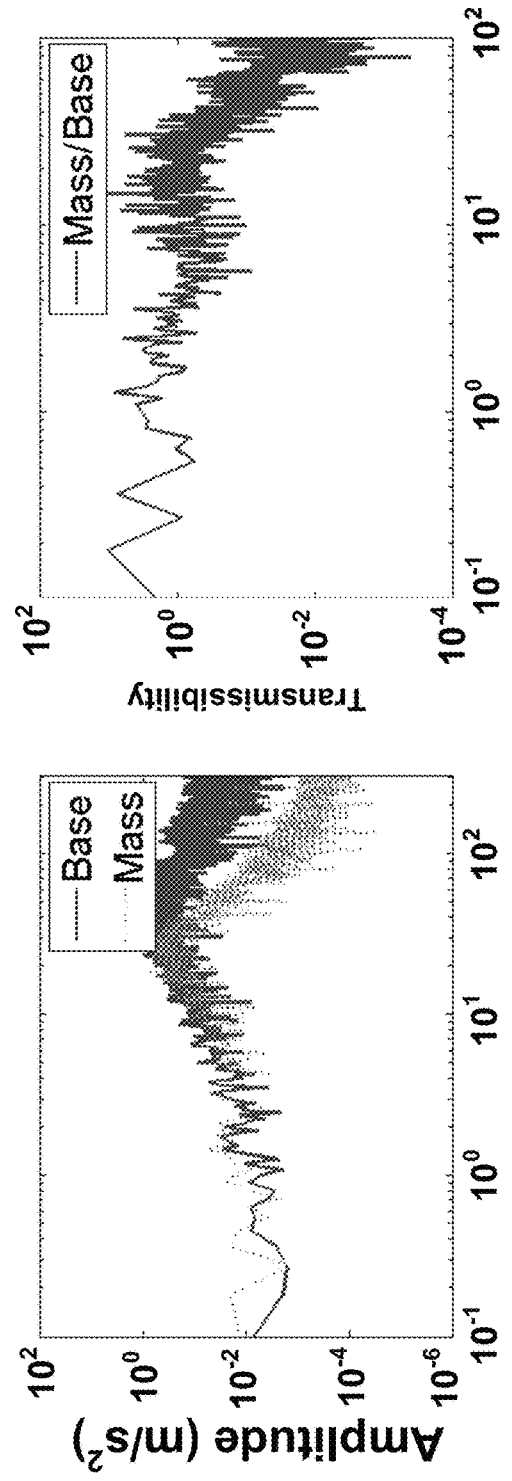
FIG. 10A
FIG. 10B
FIG. 10C

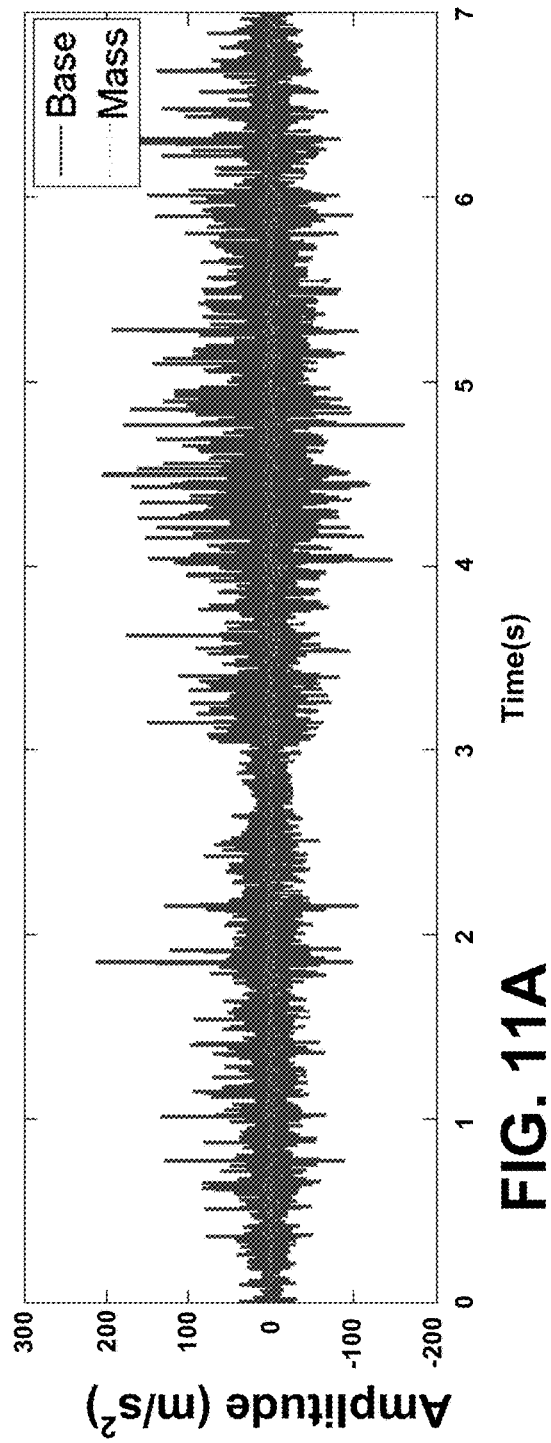
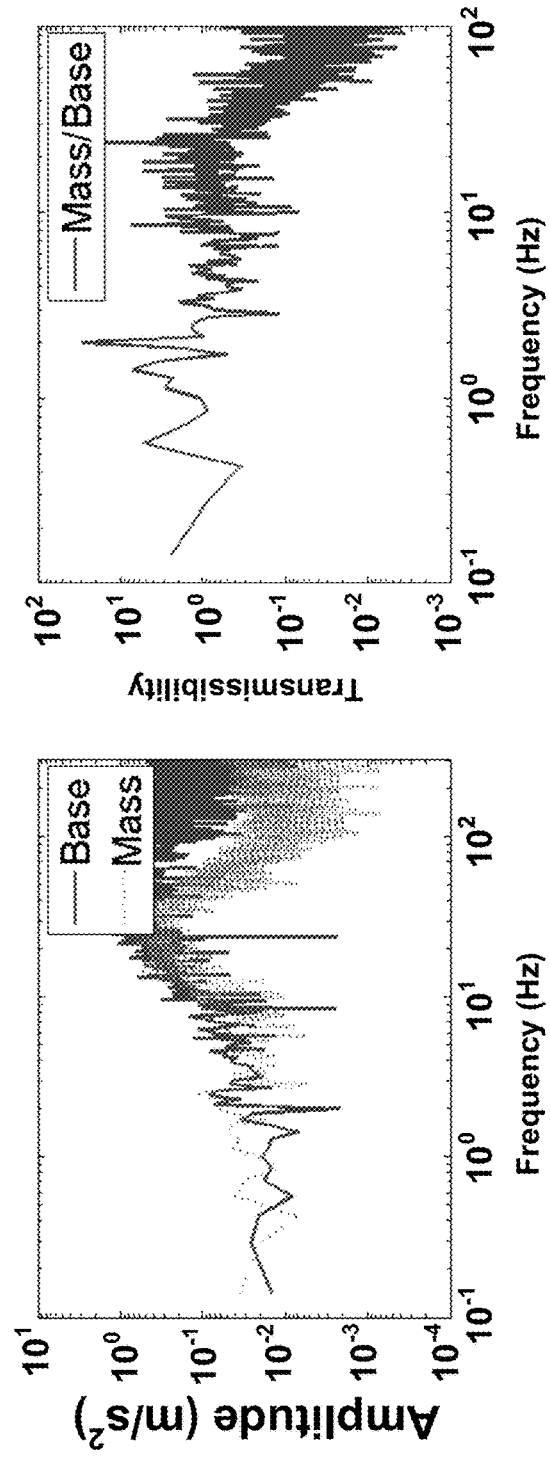
FIG. 11A
FIG. 11B
FIG. 11C

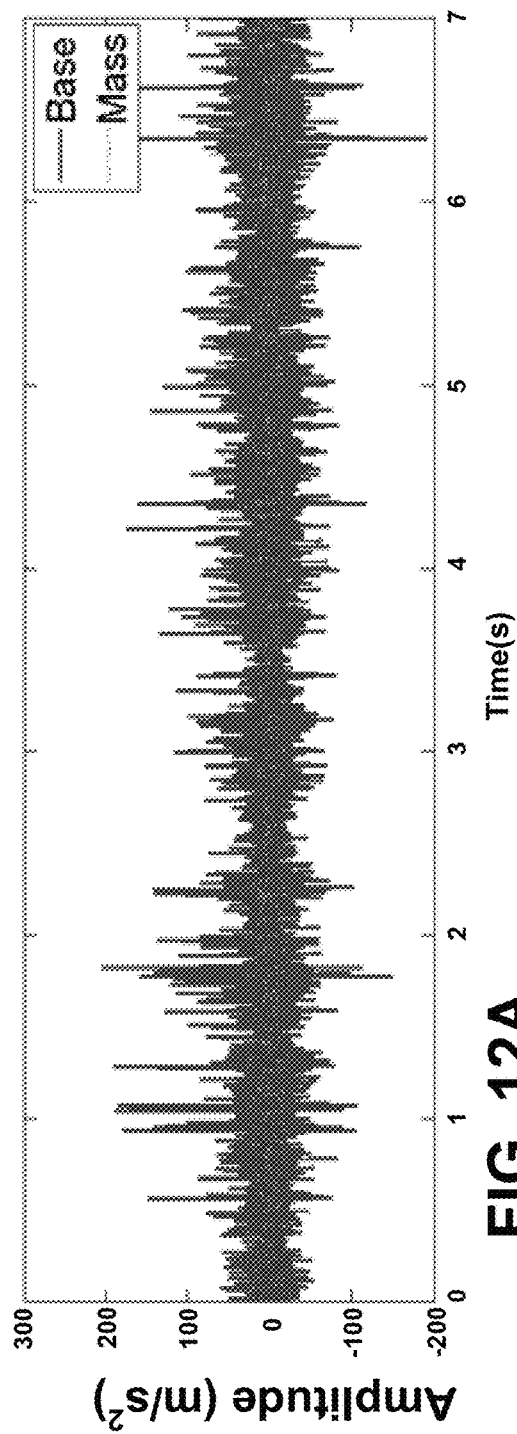
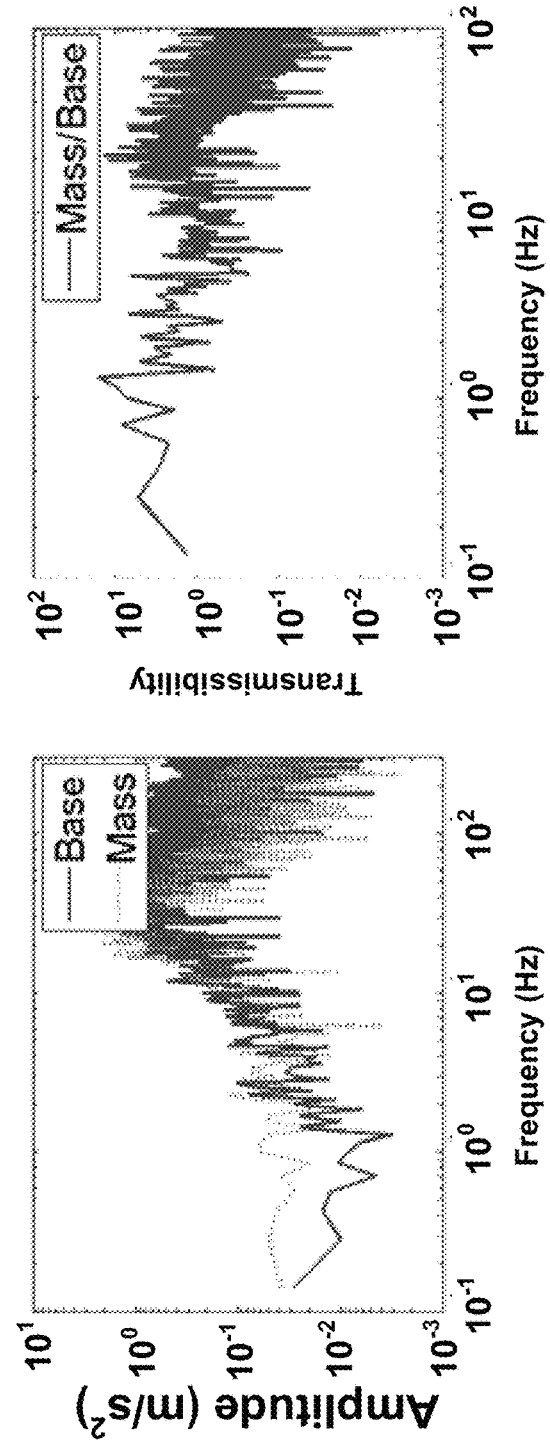
FIG. 12A
FIG. 12B
FIG. 12C

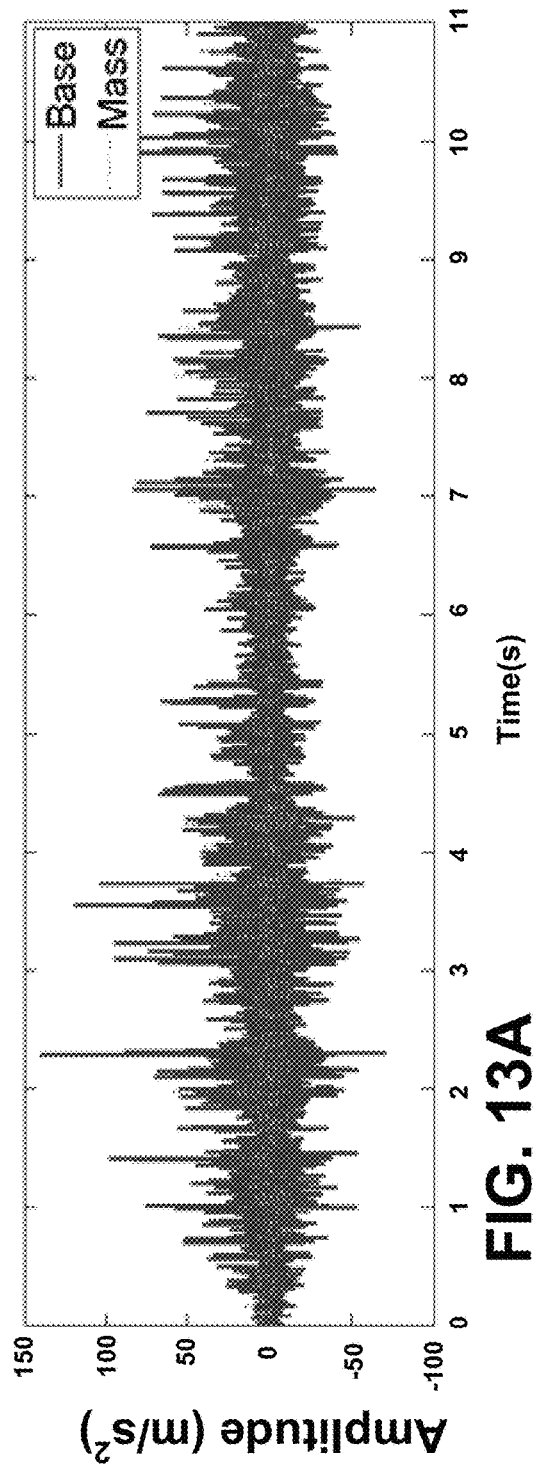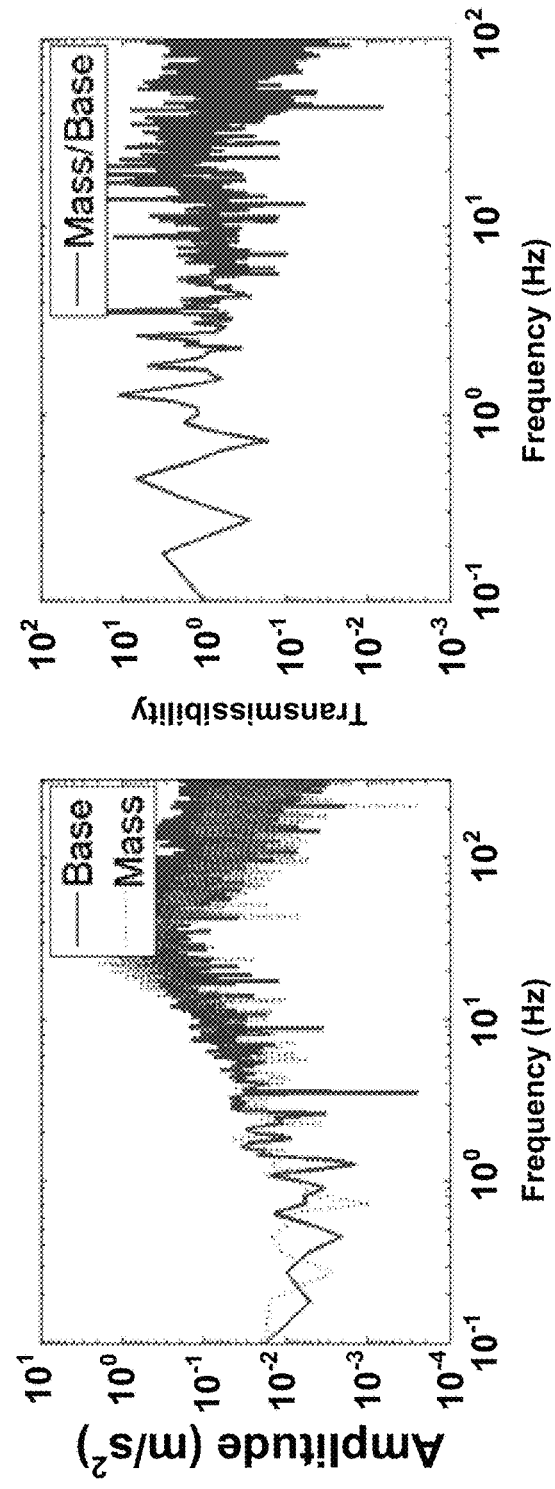
FIG. 13A
FIG. 13B
FIG. 13C

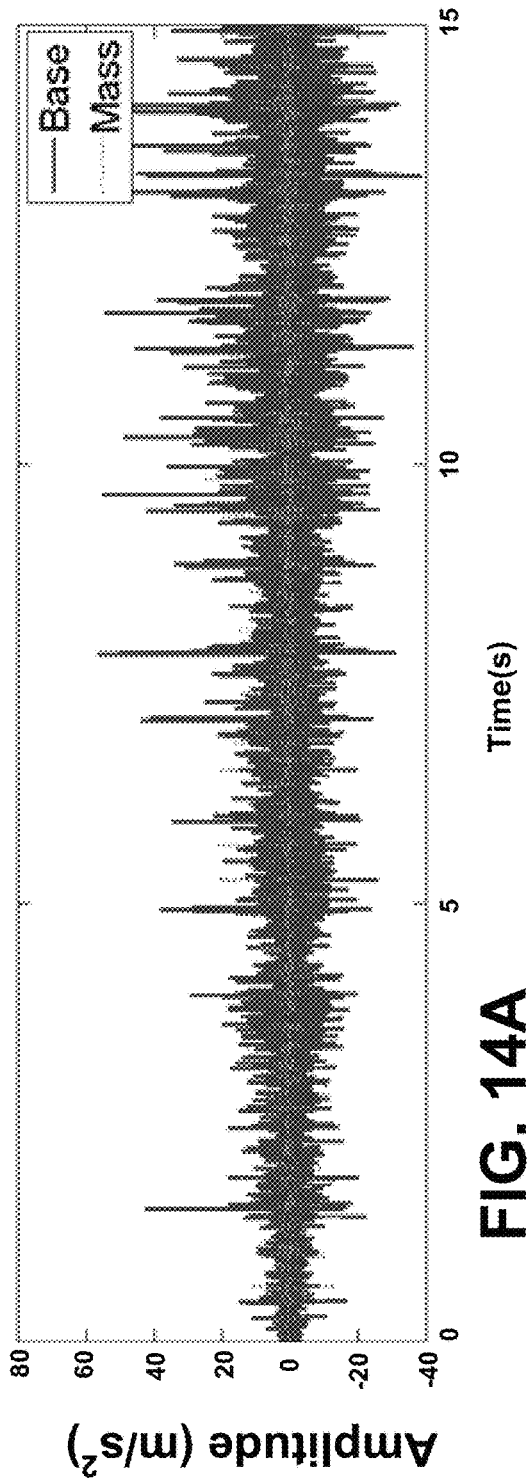
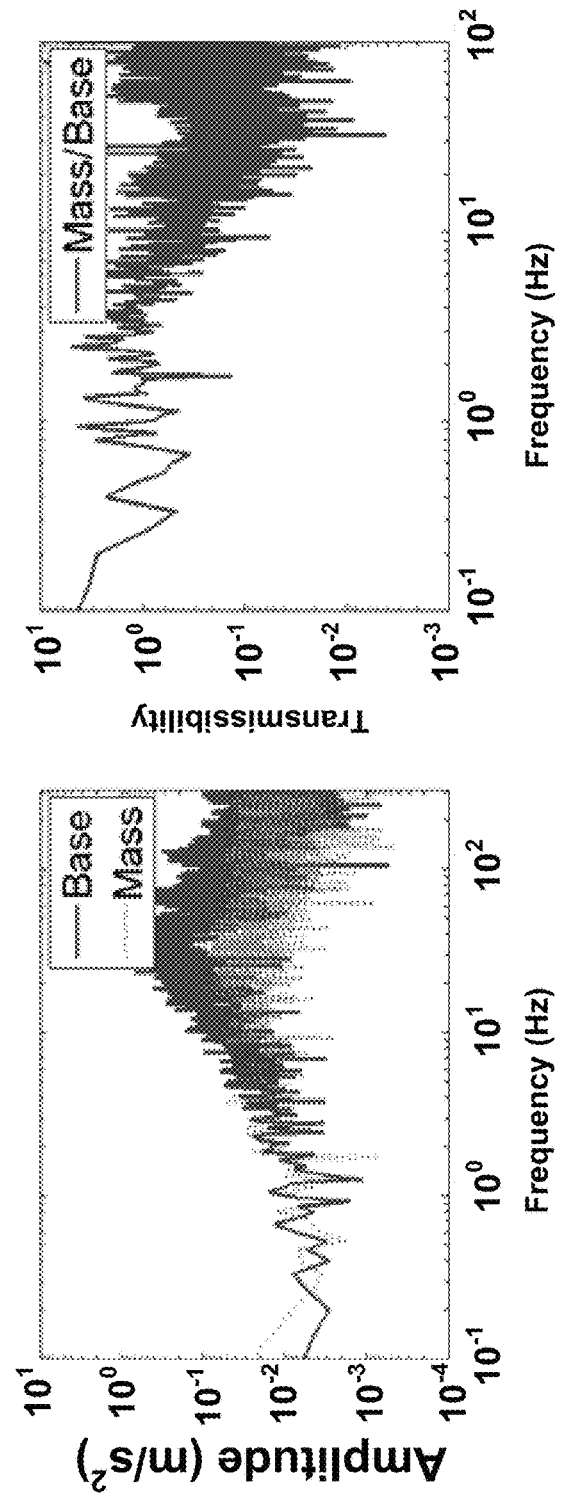
FIG. 14A
FIG. 14B
FIG. 14C

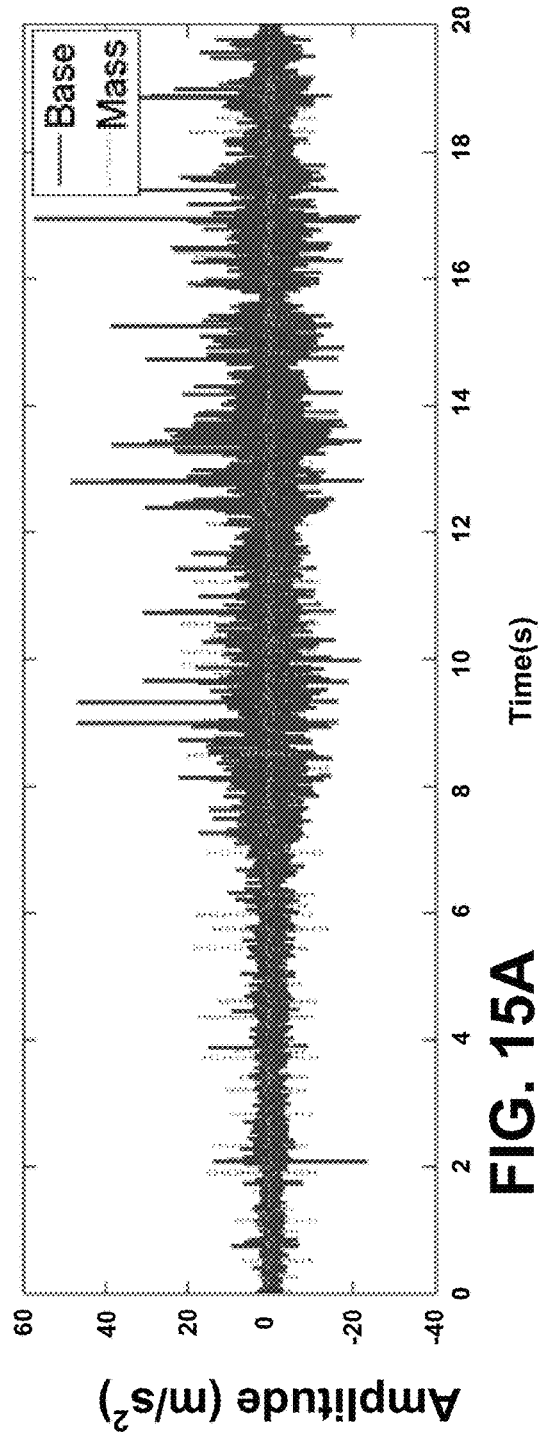
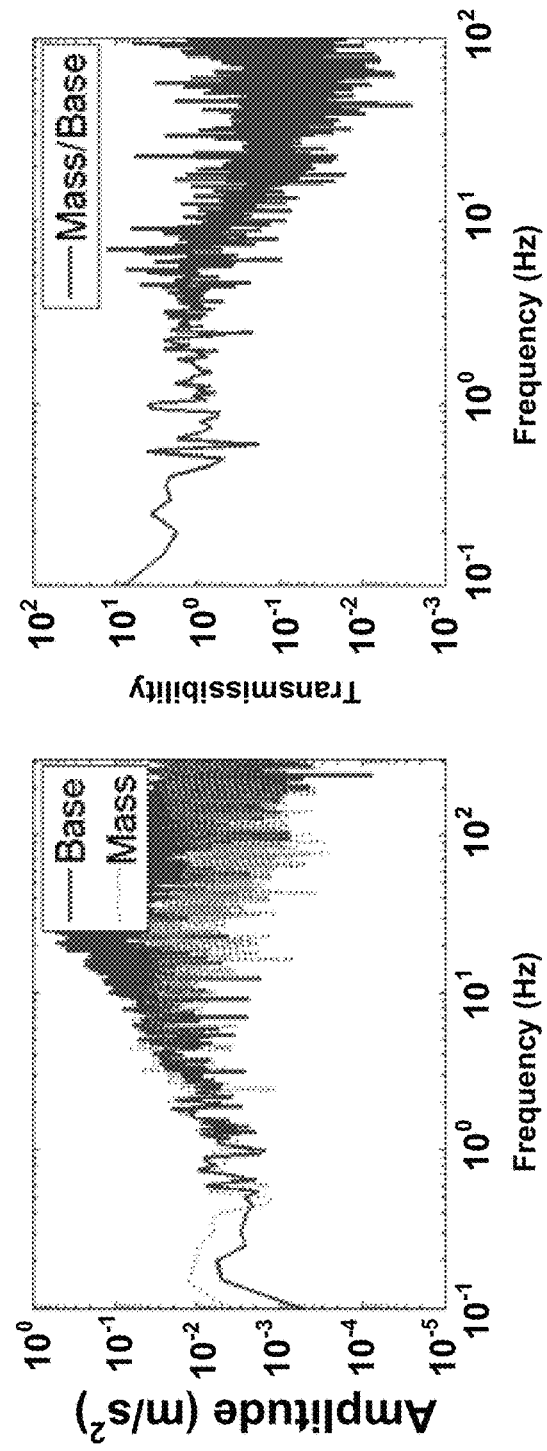
FIG. 15A
FIG. 15B
FIG. 15C

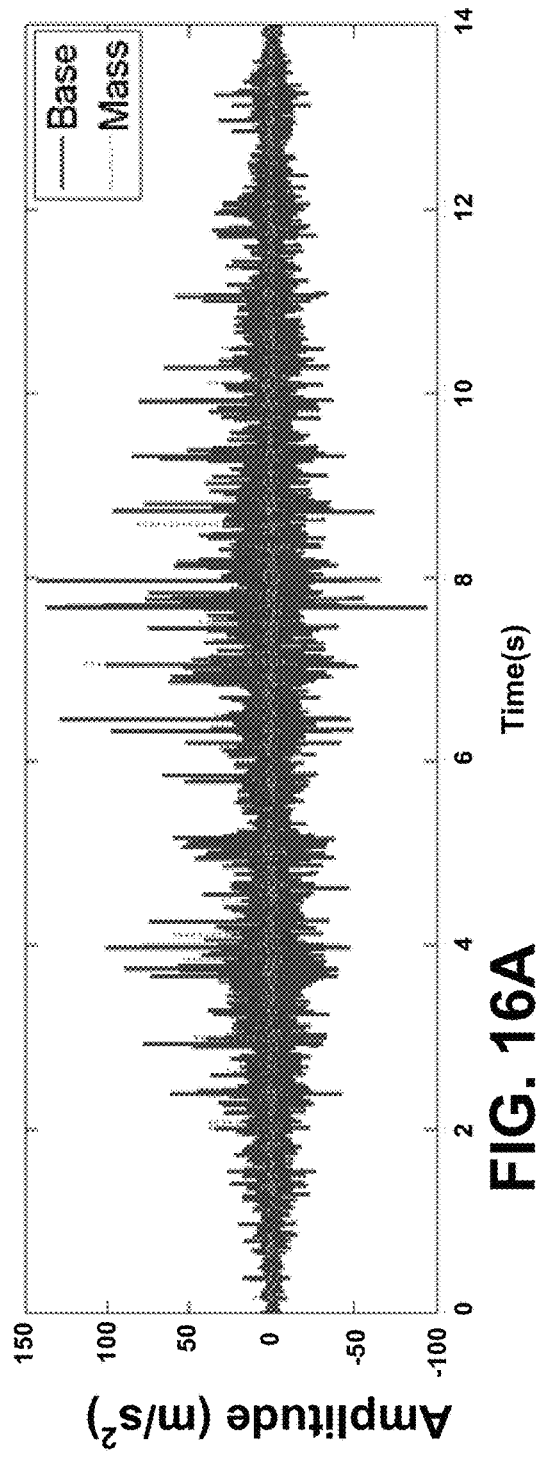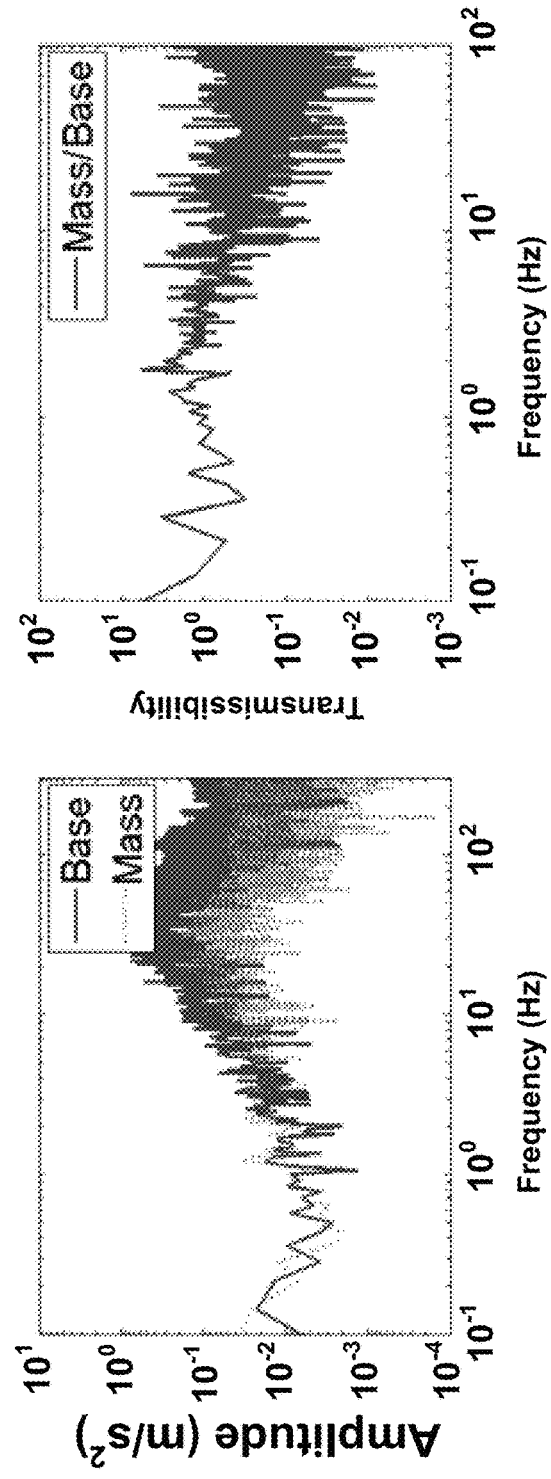
FIG. 16A
FIG. 16B
FIG. 16C

SEAT SUSPENSION UTILIZING NONLINEAR STIFFNESS DESIGN

TECHNICAL FIELD

This application relates to dampening vibration of a structure.

BACKGROUND

Drivers of vehicles, particularly off-road vehicles, are exposed to a wide range of low frequency whole-body vibrations (WBVs) and intermittent shocks. Apart from driver discomfort, fatigue, and poor performance rate, WBV is linked epidemiologically to greater risks of back pain and degenerative changes in the spine (e.g., musculoskeletal disorders (MSDs) among the exposed drivers. Studies have shown WBV exposure in many vehicles can exceed defined health cautions (e.g., per ISO-2631-1, EC Directive 2002/44). Further, increased demand for vehicles to operate at higher velocities can give rise to even greater magnitudes of WBV. Although wheel suspension design has evolved to limit WBV exposure, the ride vibration in off-road vehicles is typically controlled by a suspension mechanism incorporated into the driver seat operating in combination with large/soft tires. With such systems, vibration control generally results from strong couplings between the ride and roll/directional stability of the vehicle suspension. However, such an approach for controlling vibration can impose conflicting design requirements on the suspension systems and tires.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, methods, apparatus and/or computer program products are presented that facilitate vibration isolation and/or dampening in a suspension system.

The one or more embodiments described herein present an anti-vibration system comprising a pair of base beams, wherein the base beams of the pair of base beams are aligned in a first plane. The system further comprises a pair of upper beams, wherein the upper beams of the pair of upper beams are aligned in a second plane, and wherein the first plane and second plane are parallel, or substantially parallel. In an embodiment, the anti-vibration system further comprises a kinematic structure comprising beams and rods, wherein the kinematic structure is located between and connects the base beams to the upper beams, and wherein movement of the kinematic structure facilitates a first displacement of the upper beams along a first axis relative to a position of the base beams. In a further embodiment, the anti-vibration system further comprises a tensioning device configured to apply tension to the kinematic structure along a second axis that is orthogonal, or substantially orthogonal, to the first axis to constrain a second displacement of the kinematic structure along the second axis, wherein the second displacement being constrained along the second axis constrains a third displacement of the kinematic structure along the first axis. In an embodiment, the movement of the kinematic structure that facilitates the first displacement of the upper beams is a first movement of the kinematic structure, and the anti-vibration system further comprises a damping device configured to dampen a second movement of the kinematic structure along the second axis to dampen the third displacement of the kinematic structure along the first axis. In an embodiment, the damping device is co-located with the tensioning device. In a further embodiment, the first displacement of the upper beams along the first axis relative to the position of the base beams is at an initial distance responsive to an absence of vibrational energy or payload being applied to the anti-vibration system. In another embodiment, the tensioning device comprises at least one spring. In a further embodiment, in response to application of a compressive force to the kinematic structure in a first direction defined by the first axis, the at least one spring extends along the second axis, thereby constraining the third displacement of the kinematic structure along the first axis. In a further embodiment, in response to a reduction of a downward force on the kinematic structure along the first axis, the damping device is configured to resist motion of the kinematic structure along the second axis resulting from relaxation of the at least one spring. In an embodiment, the kinematic structure is configured to constrain motion of movable parts of the anti-vibration system to a single degree of freedom along the first axis. In a further embodiment, a relationship between a change in the third displacement along the first axis relative to the tension applied to the kinematic structure to constrain the second displacement of the kinematic structure in the second axis is a non-linear relationship. In a further embodiment, a stiffness of the kinematic structure increases non-linearly with an amount of the tension applied relative to the first displacement of the upper beams along the first axis relative to the position of the base beams. In another embodiment, the base beams comprise first attachment elements to secure the base beams to a floor of a vehicle and the upper beams comprise second attachment elements to secure the upper beams to a bottom portion of a seat of the vehicle.

In other embodiment, elements described in connection with the disclosed systems can be embodied in different forms such as a method. For example, in an embodiment, a method can be utilized to attenuate/mitigate vibration in a structure, wherein the method comprises receiving a force applying a tension to a kinematic lattice along a first axis constraining a movement of the kinematic lattice, wherein a lower portion of the kinematic lattice is attachable to a floor of a vehicle and an upper portion of the kinematic lattice is attachable to a seat of the vehicle, wherein, during motion of the vehicle, vibrational energy resulting from the motion of the vehicle causes the seat to move along a second axis relative to the floor, and wherein the second axis is orthogonal, or substantially orthogonal, to the first axis, and responsive to the constraining of the movement of the kinematic lattice along the first axis, attenuating a vibrational motion of the kinematic lattice and the seat along the second axis.

In a further embodiment of the method, the receiving of the force applying the tension comprises receiving the force applying the tension to at least one spring of the kinematic lattice.

In another embodiment, the method further comprises applying a damper in series with the at least one spring, wherein the damper is configured to dissipate energy released by the at least one spring during extension or contraction of the at least one spring along the first axis.

In another embodiment of the method, a first amount of the constraining of the movement of the kinematic lattice along the first axis relative to a second amount of the attenuating of the vibrational motion of the kinematic lattice and the seat along the second axis is defined by a non-linear relationship. In an embodiment, the non-linear relationship results from at least one spring of the kinematic lattice that creates a non-linear damping of the vibrational motion of the kinematic lattice and the seat along the second axis.

In another embodiment, the method further comprises adjusting an amount of the tension applied to the kinematic lattice to compensate for at least one of a seat payload or the vibrational energy generated from the motion of the vehicle.

According to further embodiments, a suspension system is provided that comprises a base platen configured to attach to a first part of a vehicle and an upper platen configured to attach to a second part of the vehicle above the first part. In a further embodiment, a kinematic structure can be located between and connecting the base platen to the upper platen, wherein the kinematic structure limits displacement of the upper platen to a single degree of freedom relative to the base platen, and the displacement is along a first axis. In a further embodiment, a tensioning component can be coupled to the kinematic structure and configured to constrain the displacement of the upper platen relative to the base platen, wherein the tensioning component is configured to constrain the kinematic structure along a second axis that is orthogonal to the first axis. In a further embodiment, a damper component can be configured to dissipate energy released by the tensioning component during the displacement of the base platen.

In another embodiment of the suspension system, a change in tension applied to the kinematic structure by the tensioning component results in a corresponding non-linear change to an amount of the displacement of the base platen.

In a further embodiment of the suspension system, the damper component and the tensioner component cooperate to cause the kinematic structure to vary non-linearly in stiffness from the upper platen to the base platen.

The one or more embodiments described herein present a suspension system comprising a kinematic structure located between, and attached to, a pair of base support beams and a pair of upper support beams. In an embodiment, the suspension system can be incorporated into a vehicle seat system, wherein the base support beams can be attached to a vehicle (e.g., the vehicle floorpan) and the upper support beams can be attached to the seat pan of a seat. The kinematic structure allows the displacement between the base support beams and the upper support beams (e.g., in the vertical direction) to continuously vary as the vehicle navigates a terrain (e.g., paved road, dirt road, rocky road surface, ploughed field, and the like). In an embodiment, the vertical displacement of the upper support beams relative to the base support beams is constrained by a tensioning/damping system attached to the kinematic structure, wherein the tensioning system is configured to apply tension to, and dampen, the kinematic structure in a direction orthogonal to the direction of displacement between the base platen and the top platen. Hence, in an embodiment when the direction of displacement between the base platen and the top platen is in the vertical direction, the constraining tension/dampening is applied in the horizontal direction, e.g., perpendicular to the displacement direction.

In an embodiment, the kinematic structure comprises a pair of supporting structures, generally having a X-shaped configuration, connected and operating in parallel with mechanisms (including the tensioning/damping system) which can be adjusted for both height (e.g., displacement between the base support beams and the upper support beams) and/or payload (e.g., body mass of a driver) considerations. In an embodiment, the suspension system has a nonlinear stiffness, facilitated by the kinematic system operating in combination with the tensioning system. In another embodiment, the suspension system also nonlinear damping properties, facilitated by the kinematic system operating in combination with the damping system. Theoretical analysis and experimental results are presented herein and demonstrate the advantages and versatility of the suspension system for vibration isolation, compared with that achievable with conventional suspension systems.

As further described, the suspension system is an improvement over existing suspension systems designed to mitigate WBV, wherein such benefits (in a non-limiting list) include:

a) by utilizing one or more embodiments presented herein, the inherent nonlinear quasi-zero stiffness and nonlinear damping properties of the suspension system engenders the system to have an ultra-low resonant frequency with a smaller peak value than achievable with conventional suspension systems;

b) the nonlinear stiffness and damping properties of the suspension system described herein are all adjustable with respect to several easy-to-tune structural parameters, which renders the suspension system advantageous in adapting to a variety of body masses/payloads and operational velocities, while maintaining vibration isolation, per the one or more embodiments presented herein; and c) the suspension system described herein has a simpler design than conventional suspension systems which utilize, for example, traditional cross-linkage mechanisms with air spring or active controlled seat suspensions.

Further, per the various embodiments presented herein, owing to its structural simplicity, the suspension system can be easily scaled with regard to both size and loading capacity. The structural simplicity of the suspension system facilitates cost efficient manufacture and implementation for vibration isolation. Accordingly, the various embodiments presented here describe an innovative suspension system having superior performance and nonlinear properties compared to conventional approaches for vibration control and vibration isolation.

DESCRIPTION OF THE DRAWINGS

One or more embodiments are described below in the Detailed Description section with reference to the following drawings.

FIG. 1D is a side view of example components in an anti-vibration system in direction D of FIG. 1C, in accordance with various aspects and implementations of the subject disclosure.

FIG. 1G is an exploded view of example components in an anti-vibration system in direction D of FIG. 1C, in accordance with various aspects and implementations of the subject disclosure.

FIGS. 6A-C presents respective charts showing effect of payload on vibration isolation performance under a 1st set of conditions, in accordance with various aspects and implementations of the subject disclosure.

FIGS. 7A-C presents respective charts showing effect of payload on vibration isolation performance under a 2nd set of conditions, in accordance with various aspects and implementations of the subject disclosure.

FIGS. 8A-C presents respective charts showing effect of seat height on vibration isolation performance under a 1st set of conditions, in accordance with various aspects and implementations of the subject disclosure.

FIGS. 9A-C presents respective charts showing effect of seat height on vibration isolation performance under a 2nd set of conditions, in accordance with various aspects and implementations of the subject disclosure.

FIGS. 10A-C present respective charts showing effect of utilizing a rubber pad on vibration isolation performance under a 1st set of conditions, in accordance with various aspects and implementations of the subject disclosure.

FIGS. 11A-C present respective charts showing effect of utilizing a rubber pad on vibration isolation performance under a 2nd set of conditions, in accordance with various aspects and implementations of the subject disclosure.

FIGS. 12A-C present respective charts showing effect of not utilizing a rubber pad for vibration isolation performance under a 1st set of conditions, in accordance with various aspects and implementations of the subject disclosure.

FIGS. 13A-C present respective charts showing effect of not utilizing a rubber pad for vibration isolation performance under a 2nd set of conditions, in accordance with various aspects and implementations of the subject disclosure.

FIGS. 14A-C presents respective charts showing effect of velocity on vibration isolation performance under a 1st set of conditions, in accordance with various aspects and implementations of the subject disclosure.

FIGS. 15A-C presents respective charts showing effect of velocity on vibration isolation performance under a 2nd set of conditions, in accordance with various aspects and implementations of the subject disclosure.

FIGS. 16A-C presents respective charts showing effect of velocity on vibration isolation performance under a 3rd set of conditions, in accordance with various aspects and implementations of the subject disclosure.

DETAILED DESCRIPTION

Figure 1A:
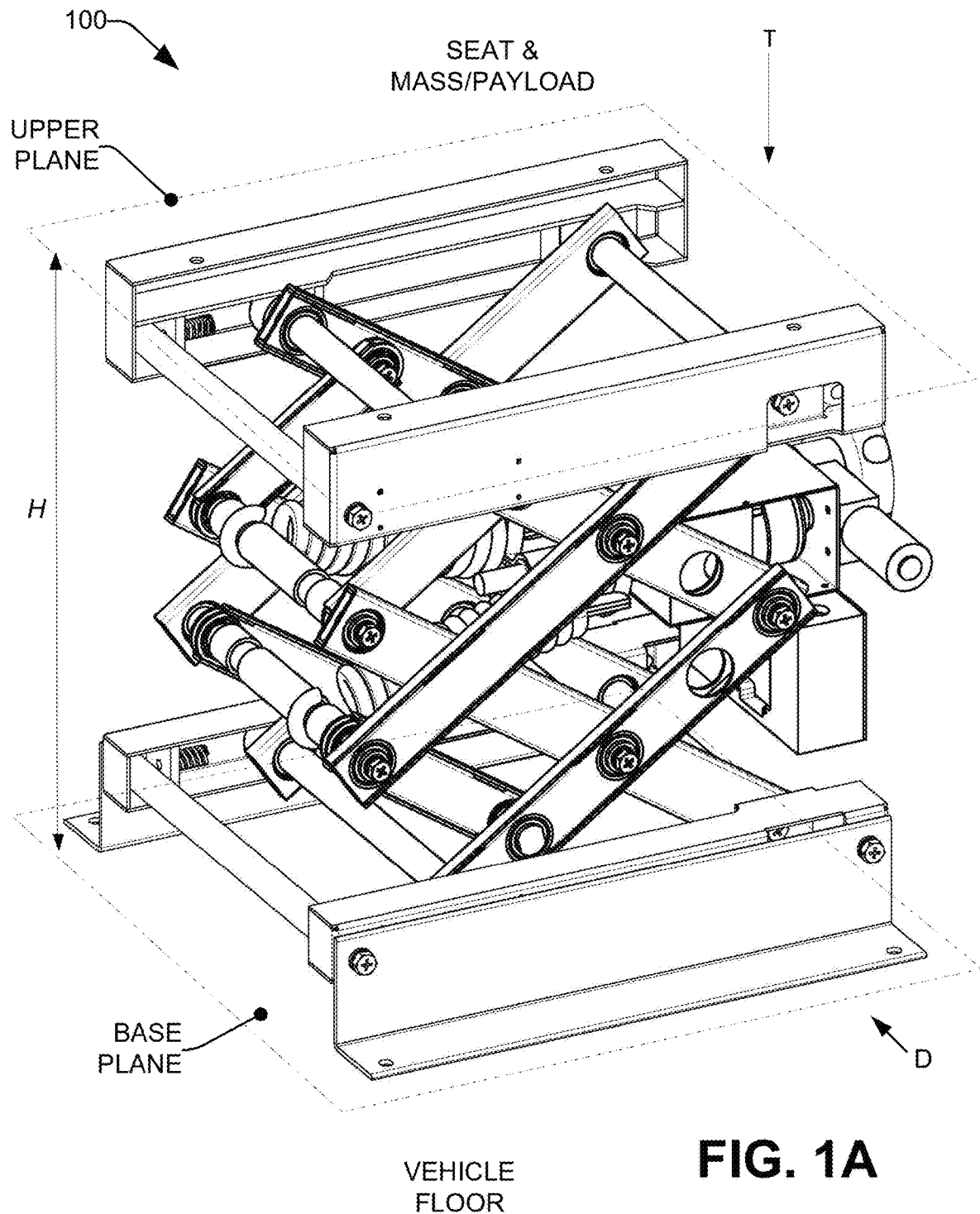
FIG. 1A is a component assembly drawing of example components in an anti-vibration system in accordance with various aspects and implementations of the subject disclosure.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting. As used herein, "data" can comprise metadata. Further, ranges A-n are utilized herein to indicate a respective plurality of devices, components, signals etc., where n is any positive integer.

It is to be appreciated that while the various embodiments presented herein are presented with regard to application of a suspension system to isolate vibrations experienced in a seat onboard a vehicle (e.g., an off-road vehicle, a truck, a delivery vehicle, a garbage truck, etc.), the presented embodiments are not so limited and can be applied to any situation where a first structure is to be by vibrational isolated from a second structure experiencing vibrational energies, shock loading, and the like. Further, applications are not limited to civilian use, e.g., haulage, offroad navigation during checking of power lines, etc., but can be utilized in any vehicle/system such as military equipment, marine equipment, railroad equipment, aviation equipment, manned spaceflight, and the like. Furthermore, the embodiments presented herein are not limited to reducing vibration experienced by a vehicle operator (e.g., driver) or passenger(s), but can also be utilized to reduce vibration(s) affecting goods during transportation. For example, the suspension system can be incorporated into a cargo/storage area of a vehicle to reduce vibrations that would otherwise be incident upon the goods in a system that does not isolate/attenuate vibrational energy.

Research into the vibration and shock isolation properties of vertical seat suspension systems indicates that the vibration attenuation performance of suspension seats is strongly dependent upon the magnitude and frequency contents of the energy waves giving rise to the vehicle vibration. Field studies measuring the vibration performance of conventional suspension seats employed in off-road vehicles show conventional suspension systems have limited ability to attenuate the vibrational energy transmitted through the suspension seat structure and can even amplify the vibrational energy transmitted to the driver, e.g., transmitted in the vertical vibrational direction during motion of a vehicle in which the suspension seat is located. The lack of attenuation and/or further amplification of the vibrational energy can result from a lack of suspension tuning with regard to the intensity and frequency contents of the vehicle vibrations being transmitted through the conventional suspension seat.

Suspension seat design also involves additional challenges associated with varying body mass and seated height of the respective person using the seat. Variations in the body mass may affect the natural frequency of the suspension seat and, accordingly, the vibration isolation performance of the suspension seat.

Generally, a suspension seat yields best vibration isolation performance when the seat is adjusted to the mid-ride position so as to permit maximum suspension travel of the seat during compression and rebound (e.g., along the vertical direction). The effective suspension stiffness, particularly for common air suspensions, and the permissible suspension travel, however, are affected by the driver selected seated height, which may lead to the suspension system hitting motion limiting stops (end-stop impacts) incorporated into the conventional air suspension. The vibration isolation characteristics of suspension seats are generally evaluated in the laboratory using the guidelines provided in ISO-7096, which require measurements with a seat adjusted to mid-ride and loaded with human subjects of particular body mass, namely 55 and 98 kg. A few studies have also measured the seat suspension performance in the field, which suggest that the field-measured vibration transmissibility magnitudes are generally higher than those obtained in the laboratory. The higher magnitudes have been attributed to suspension friction and end-stop impacts, which may not be encountered during laboratory tests.

Considerable efforts have been made to seek optimal passive, and controllable semi-active and active seat suspension designs based on analytical models with a wide range of excitations (e.g., wide range of vibrational energies and forces). Modelling of these various suspension seats treat the seat suspension as a dynamic system having either a single- or two-degrees-of freedom (DOF), including linear viscoelastic representation of the seat cushion. The majority of the models are coupled to a human body, with the body represented by either a rigid mass or a seated-body biodynamic model. Through measurements of different suspension seats coupled with human subjects and the corresponding equivalent rigid mass, tests indicate that contribution of human biodynamics is small for low natural frequency suspensions but notable for high natural frequency seats. A rigid mass representation of a human body can thus yield reasonably accurate estimation of vibration isolation properties of low natural frequency suspension seats, which provide only little excitation of the fundamental biodynamic mode near 5 Hz.

The vast majority of conventional suspensions employ a cross-linkage mechanism with rollers to ensure pure vertical motion of the seat. The orientations of the air/mechanical spring and damper, generally attached to the cross links, thus vary considerably during the vibration cycle, which lead to nonlinear variations in effective stiffness and damping with the nature of base vibration. However, the aforementioned studies on passive, semi-active, and active seat suspension systems have employed equivalent vertical suspension stiffness and damping, while neglecting the contributions due to suspension nonlinear kinematics.

The various embodiments presented herein relate to a passive suspension system. The suspension system has a nonlinear stiffness and, in an embodiment, comprises of paired X-shaped supporting structures arranged and operating in parallel. In an embodiment, a tuning mechanism can be utilized to assist with height/weight tuning. In an embodiment, the tuning mechanism can be connected to one or more springs which can be utilized to manually or electrically adjust pre-extension of the one or more springs to accommodate different height and payload requirements. One or more embodiments presented herein utilize spring and damper connection methods, enabling nonlinear properties of the suspension system to improve vibration isolation at low frequencies and/or in a broadband frequency range. Further, the effects of static stiffness and the influence imparted by different structural parameters on system isolation performance are also presented. In one or more embodiments, the suspension system is a passive system, with simultaneous and beneficial nonlinear stiffness and nonlinear damping, enabling achievement of a tunable ultra-low resonant frequency and advantageous anti-resonance characteristics. The beneficial properties of the suspension system, presented herein in the various embodiments, are adjustable with respect to structural parameters in comparison with other conventional suspension systems.

It is to be appreciated that the terms "support", "beam", "rod", "bar", "shaft", "strut", "member", etc., can be used interchangeably.

It is to be appreciated that the term "oscillation" is used herein to describe a motion over a given (fixed) position, wherein the oscillation is constrained to largely be in respective upward and downward directions (linear oscillation). However, the oscillation is not a simple repetitive motion, but rather varies in magnitude (displacement) as a function of a degree of motion, force, etc., resulting from motion of a vehicle over a surface. For example, where a vehicle is being driven off-road, the terrain being navigated can vary wherein the motion of the vehicle wheels and suspension results in a transfer of energy to the seat structure, causing the seat to bounce up and down in an irregular, chaotic manner.

1. Suspension System Structure, Tensioning, and Dampening

Figure 1B:
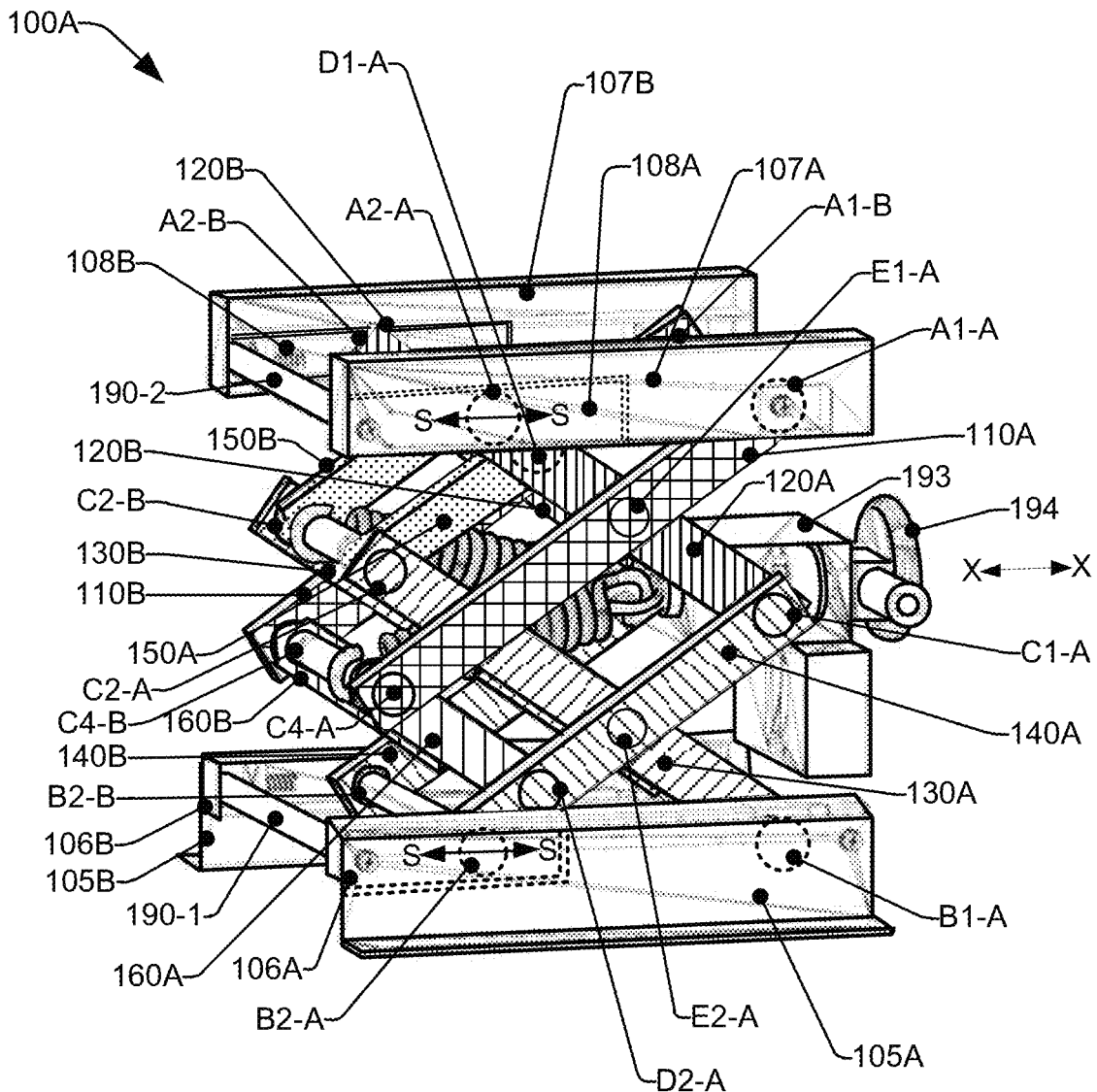
FIG. 1B is a component assembly drawing of example components in an anti-vibration system in accordance with various aspects and implementations of the subject disclosure, with various components shaded to facilitate viewing.
Figure 1C:
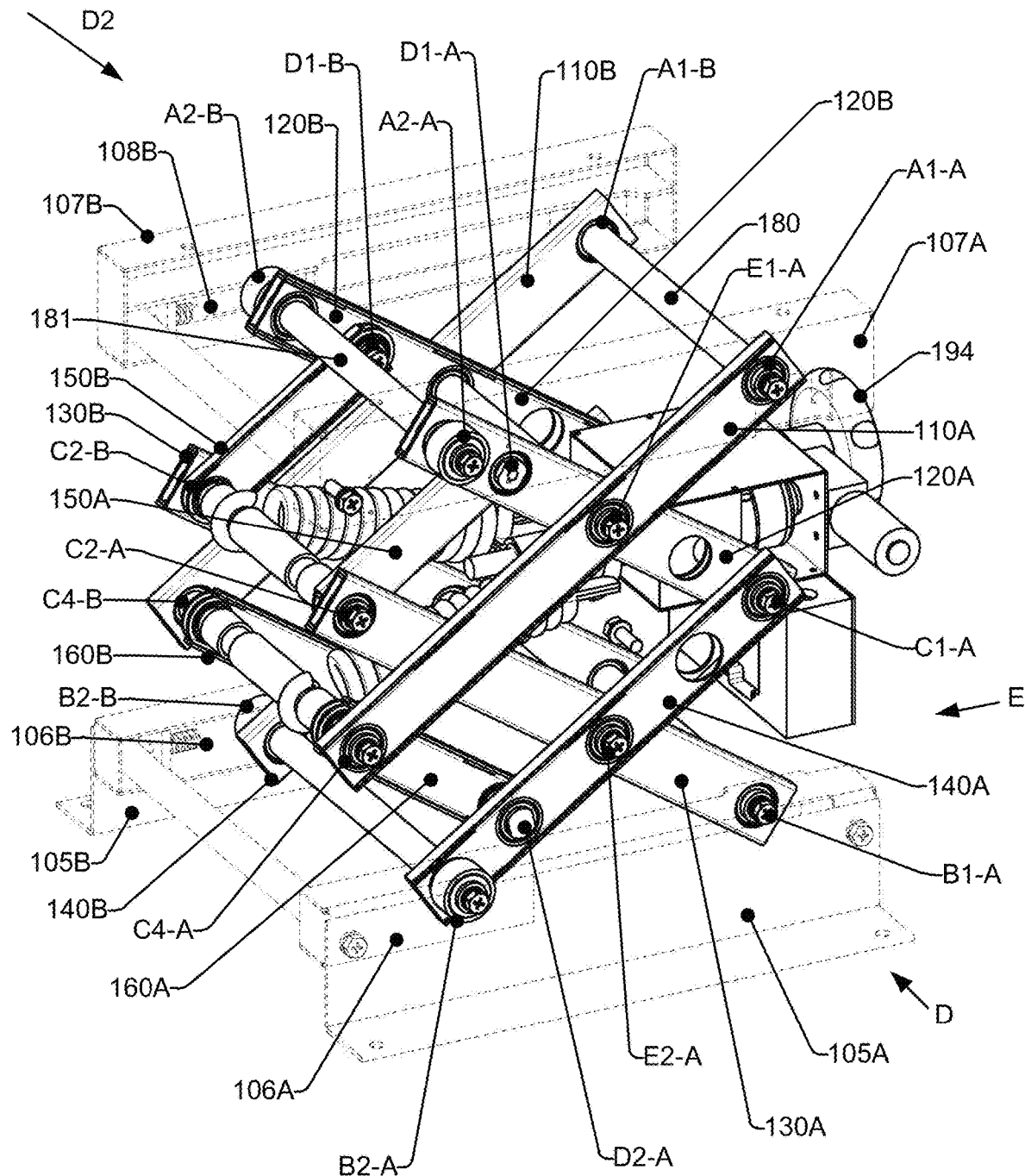
FIG. 1C is an assembly drawing of example components in an anti-vibration system with the upper supports and base supports rendered in hidden detail to enable viewing of the various components forming a kinematic structure, in accordance with various aspects and implementations of the subject disclosure.
Figure 1E:
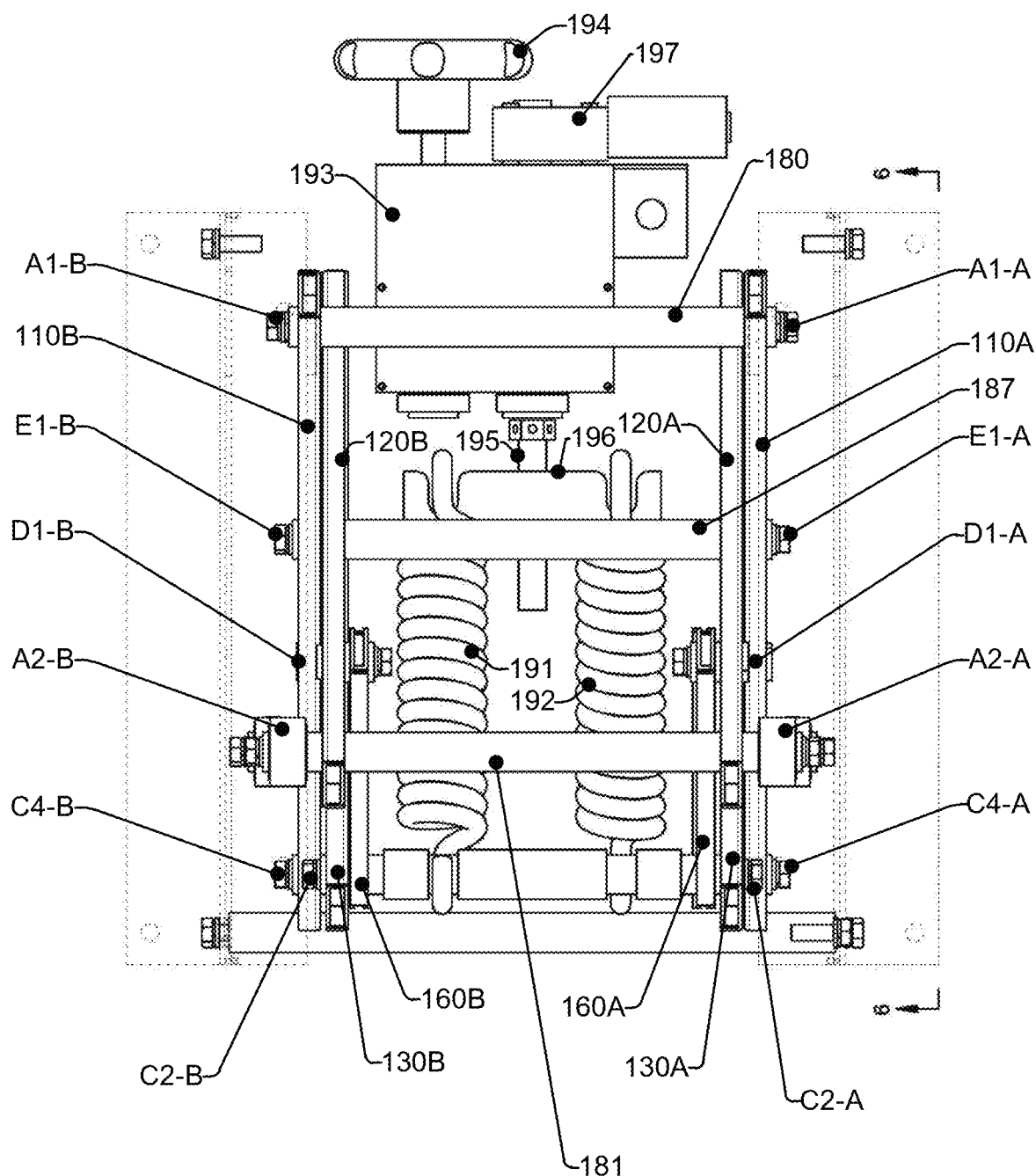
FIG. 1E is a top view of example components in an anti-vibration system in direction T of FIG. 1A, in accordance with various aspects and implementations of the subject disclosure.
Figure 1F:
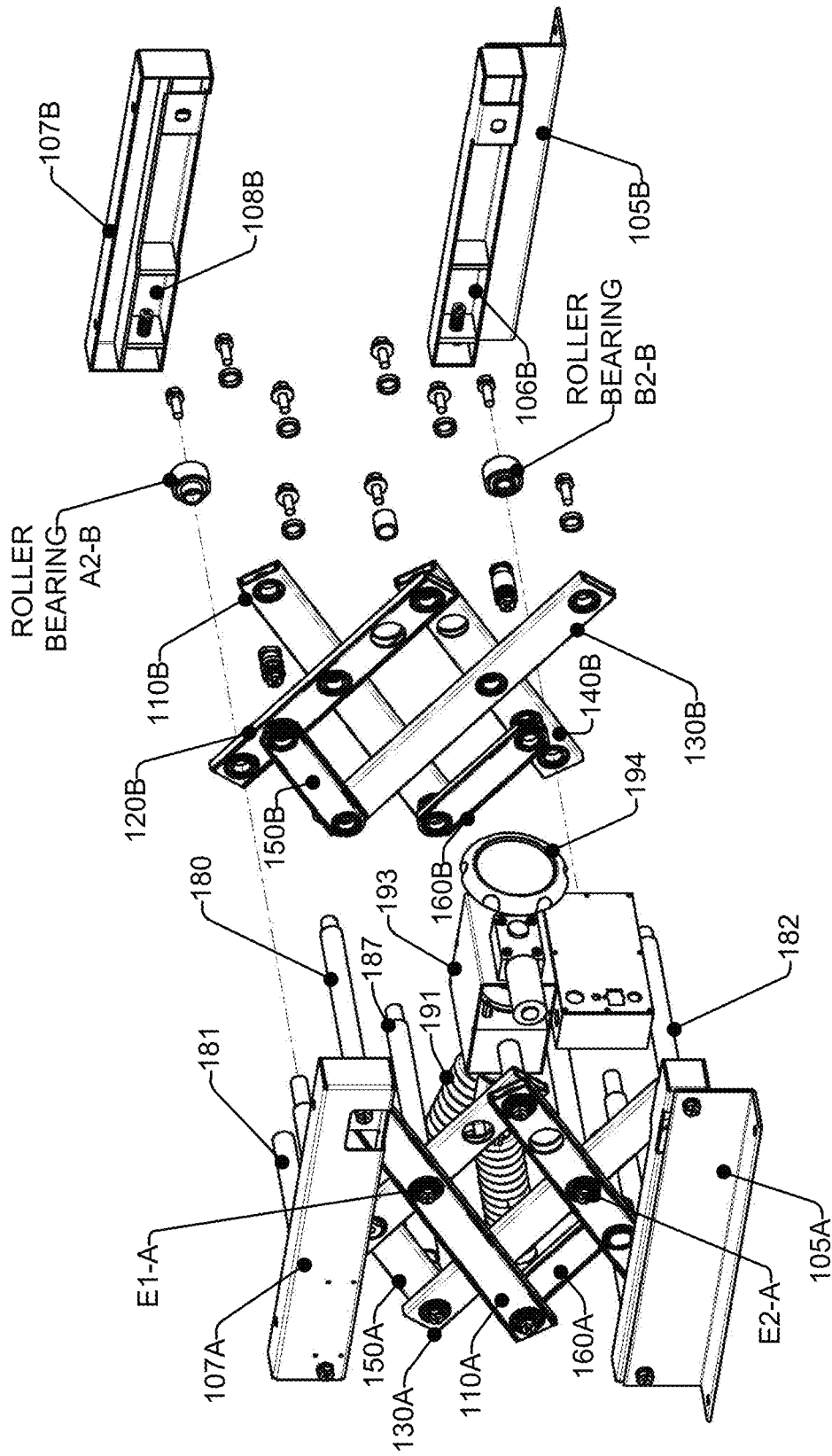
FIG. 1F is an exploded view of example components in an anti-vibration system in direction D2 of FIG. 1C, in accordance with various aspects and implementations of the subject disclosure.
Figure 1H:
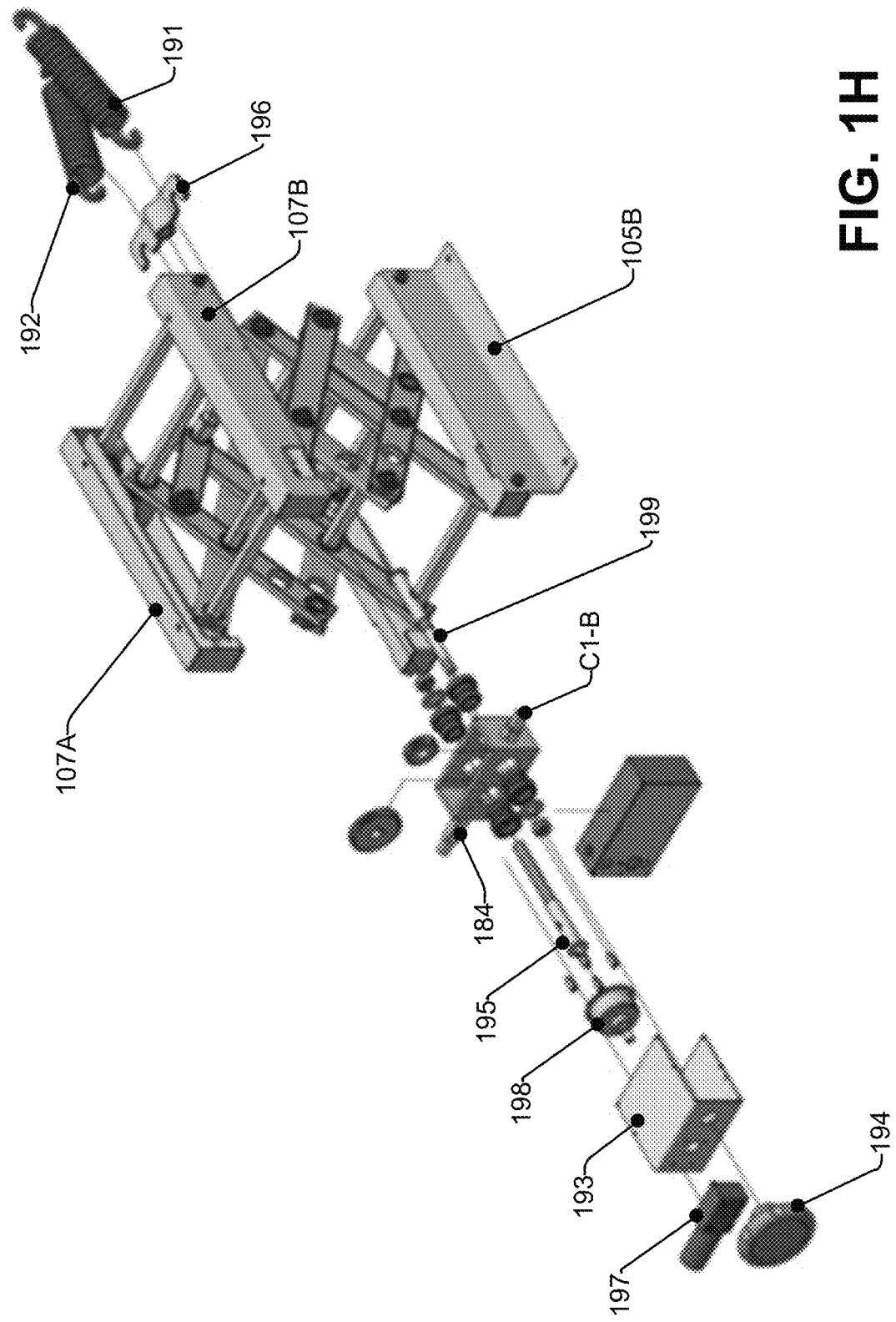
FIG. 1H is an exploded view of example components in an anti-vibration system in direction E of FIG. 1E, in accordance with various aspects and implementations of the subject disclosure.
Figure 1I:
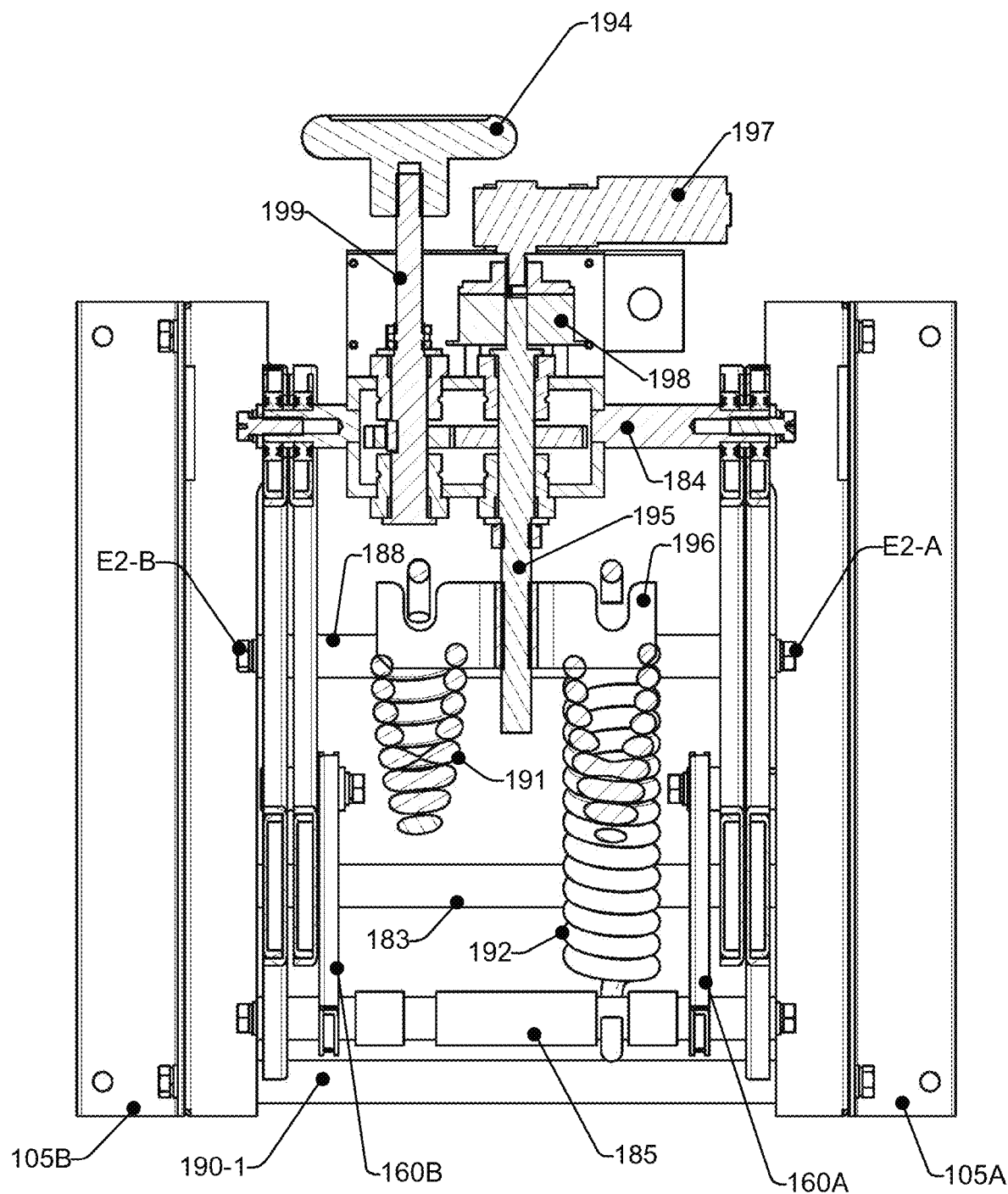
FIG. 1I is a sectional view of example components in an anti-vibration system, with the section along the center line CL of FIG. 1D, in accordance with various aspects and implementations of the subject disclosure.

Turning now to the drawings, FIGS. 1A-1I present various illustrations of a suspension system 100 that can be utilized to reduce isolate vibrations, e.g., in a seat, wherein the various FIGS. 1A-1I present component assembly drawings and exploded view component drawings from various viewpoints. FIG. 1A is a component assembly drawing, FIG. 1B is an assembly drawing with various beams shaded to facilitate viewing, FIG. 1C is an assembly drawing with the upper supports and base supports rendered in hidden detail to enable viewing of the various components forming a kinematic structure, FIG. 1D is a side view in direction D of FIG. 1C, FIG. 1E is a top view in direction T of FIG. 1A, FIG. 1F is an exploded view in direction D2 of FIG. 1C, FIG. 1G is an exploded view of example components in direction D of FIG. 1C, FIG. 1H is an exploded view of example components in direction E of FIG. 1E, and FIG. 1I is a sectional view of example components, with the section along the center line CL of FIG. 1D.

Figure 2:
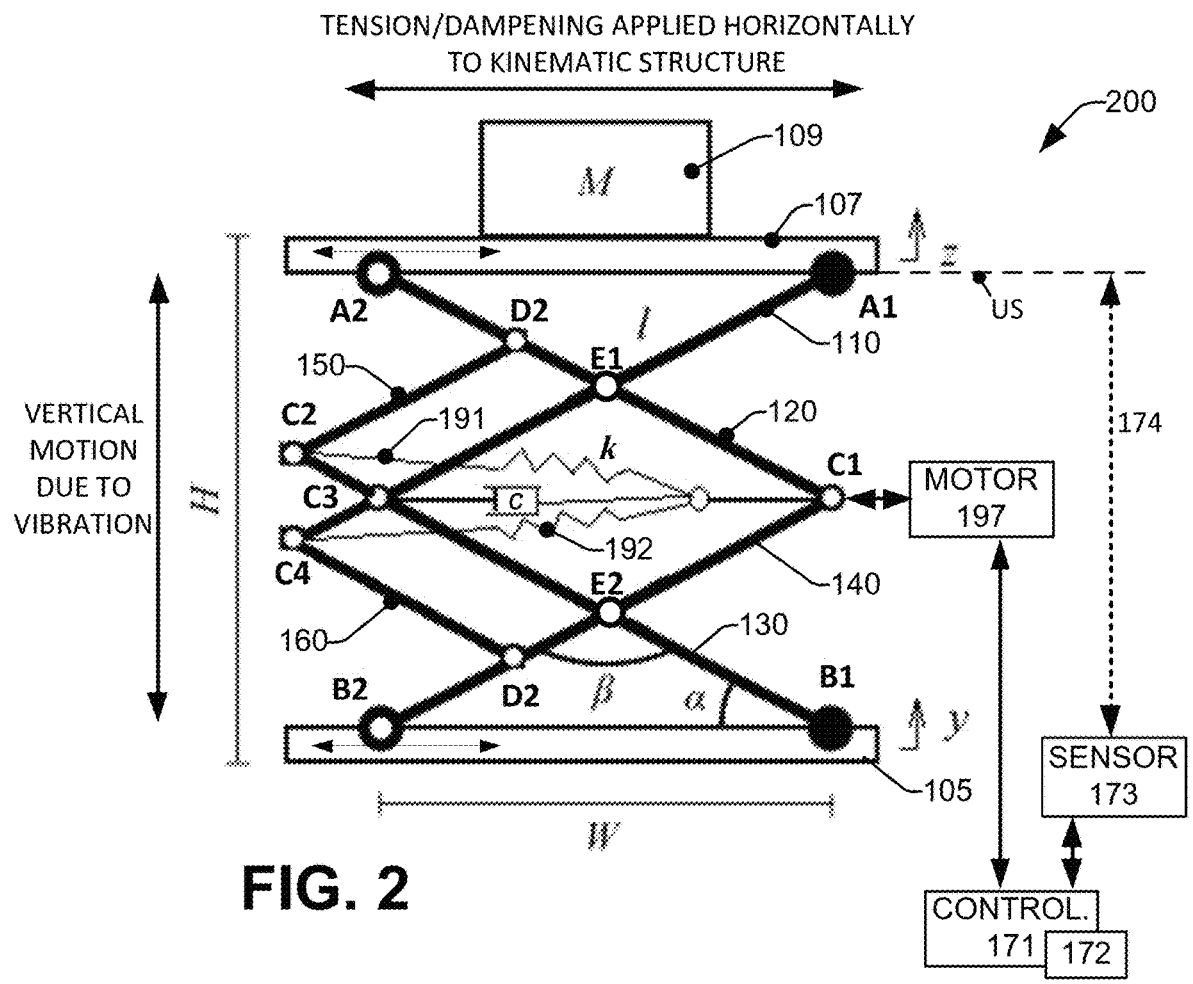
FIG. 2 presents a mathematical model representation (in direction D of FIG. 1A) illustrating respective components presented in a vibration isolation system and various parameters/variables, in accordance with various aspects and implementations of the subject disclosure.

FIGS. 1A-1I can be read in conjunction with FIG. 2, wherein FIG. 2 presents a representation 100B (in direction D of FIG. 1A) illustrating respective components and parameters presented in the suspension system 100 of FIGS. 1A-1I along with various parameters/variables to facilitate conveyance of the various embodiments presented herein.

Owing to the various pairs of beams, rods, joints, etc., utilized to construct suspension system 100, in conjunction with the mathematical model representation of FIG. 2, a reference number convention of a single number plus alternatives indicating duplicate common components is utilized herein. For example, on FIG. 2 a base support beam is indicated with numeral 105, while in FIG. 1C, due to there being a pair of base support beams, the pair of beams are respectively labeled 105A (e.g., the forward beam projecting from the paper) and 105B (e.g., the rearward beam receding into the paper). Similarly, a joint A1 on FIG. 2 is referenced as A1-A and A1-B on FIG. 1C. Further, to aid readability of connection of various beams etc., reference is made to the respective ends of a beam, a joint, and a bearing, using a common reference. For example, in FIG. 1B, an end of a beam 110A that connects to the upper support beam 107A is labeled A1-A, however, the joint at which beam 110A connects to the upper support beam 107A is also referenced as joint A1-A. Further, components may be referenced herein in a plurality of ways, e.g., the pair of base beams 105A and 105B may also be referred to herein as 105A-B or 105A&B.

As shown in FIGS. 1A-1I and FIG. 2, a plurality of support beams are connected by a kinematic structure, wherein the suspension system 100 has a structure similar to a scissor lift-type elevating platform, also known as a pantograph. However, unlike a scissor lift structure comprising a 4-beam rhombus structure where the lengths of the respective beams are of equal length (e.g., forming the sides of the 4-beam rhombus structure), per the various embodiments presented herein, the lengths of respective paired beam lengths are different to facilitate a tensioning load/damping force to be applied to the kinematic structure.

A first pair of support beams, base support beams 105A and 105B, are located at the base of the suspension system 100, and a second pair of support beams, upper support beams 107A and 107B, are located at the top of the suspension system 100. As shown in FIGS. 1A and 1D, the base support beams 105A-B are aligned in a first plane/base plane (e.g., wherein the first plane can be a plane of attachment between the base support beams 105A-B and a vehicle floor) and the upper support beams 107A-B are aligned in a second plane/upper plane (e.g., wherein the second plane can be a plane of attachment between the upper support beams 107A-B and a vehicle seat). In an embodiment, the kinematic structure can be configured to constrain motion of the upper support beams 107A-B relative to the base support beams 105A-B in the vertical direction only, wherein, the first plane and second plane remain parallel to each other both when the vehicle is stationary and when in motion. Accordingly, the dimensional constraint imparted by the kinematic structure upon the base support beams 105A-B and upper support beams 107A-B limits the suspension system 100 to motion having one degree of freedom/a single degree of freedom (SDOF).

In an embodiment, the base support beams 105A and 105B can be configured to be attached to a chassis/floor/floorpan of a vehicle (not shown) to which the suspension system 100 is located upon. In another embodiment, the upper support beams 107A and 107B can be configured to have a seat (e.g., a seatpan, not shown) affixed thereto. Accordingly, the suspension system 100 can be utilized to attach a seat to a vehicle, wherein the seat can be a driver's seat, passenger seat, etc. As shown in FIG. 2, the relative position of the bottom support beams 105A-B can move in the vertical direction, as indicated by vector y, e.g., when attached to the vehicle floorpan, and the upper support beams 107A-B can move in the vertical direction, vector z, during motion of the vehicle.

Accordingly, during motion of the vehicle to which the suspension system 100 is attached to, vibrations can cause the upper support beams 107A-B to move away and towards the base support beams 105A-B as the suspension system 100 vibrates during the motion of the vehicle. The upward and downward motion of the upper support beams 107A-B relative to the base support beams 105A-B, and the variation in displacement between the upper support beams 107A-B relative to the base support beams 105A-B is indicated by parameter H on FIG. 2. Depending upon the motion of the vehicle to which the suspension system 100 is attached (e.g., as a result of the terrain being navigated by the vehicle), an inordinate variety of external vibrations (and associated forces) may be influencing the vibrations incident upon, and being transmitted across the suspension system, wherein the vibrations can be oscillatory, linear, non-linear, complex, irregular, chaotic, and the like.

As further shown, a mass 109 (e.g., mass of a vehicle operator or other human sat in a seat supported by the suspension system 100) can be supported by the upper support beams 107A and 107B. While the vehicle is at rest, the displacement between the upper support beams 107A-B and the base support beams 105A-B can be of a distance $H_0$. When in motion, the vehicle motion/vibrations/forces experienced by suspension system 100 can cause the mass 109 to move away from base support beams 105A-B which can increase the displacement H to $H_1$, where $H_1 > H_0$. Similarly, vehicle motion can cause the mass 109 to move towards the base support beams 105A-B (e.g., gravity or other forces to return the energy of suspension system 100 to zero) which can reduce the displacement H to $H_3$, where $H_3 < H_1$. The continued motion of the vehicle can give rise to a random variation in the displacement H across a plurality of magnitudes (e.g., as a result of velocity, momentum, acceleration, braking, suspension system, mass 109, mass of vehicle, road surface conditions, and the like), e.g., a displacement $H_3 > H_1$, a displacement $H_4 < H_0$ and $H_4 > H_2$, etc.

In an embodiment, the kinematic structure portion of the suspension system 100, located between the base support beams 105A-B and the upper support beams 107A-B can comprise of a plurality of beams, bearings, connectors, and joints. As shown in FIGS. 1A-1I in combination with FIG. 2, the kinematic structure comprises two pairs of X-shaped supports located one over the other, and further, the two pairs of X-shaped supports are duplicated on a first side and a second side of the suspension system 100. As shown in FIG. 1D, the suspension system 100 can be considered to be comprised of two mirrored halves of a kinematic structure, e.g., a lower kinematic structure (lower KS) is mirrored by an upper kinematic structure (upper KS).

A first pair (upper pair) of X-shaped supports are respectively formed by beams 110A and 120A, and a duplicate of the first pair of beams 110A & 120A are formed by a second pair of beams 110B and 120B. A third pair (lower pair) of X-shaped supports are respectively formed by beams 130A and 140A, and a duplicate of the third pair of beams 130A and 140A are formed by a fourth pair of beams 130B and 140B. It is to be noted that the X-shaped structures (respectively formed from beams 110A & 120A, 110B & 120B, 130A & 140A, and 130B & 140B) do not form perfect X shapes (as typically found with a pantograph) owing to the length of beams 110A and 110B being longer than respective beams 120A and 120B, and the length of beams 130A and 130B being longer than respective beams 140A and 140B, as shown in FIGS. 1D and 2, the distance M1 created as a function of the length of beams 120A-B and 140A-B, and the distance M1+M2 created as a function of the length of beams 110A-B and 130A-B.

In an embodiment, the beams 110A, 110B, 130A, and 130B can be of equal length, and are of the longest length of the beams creating the kinematic structure between the base support beams 105A and 105B, and the upper support beams 107A and 107B. In a further embodiment, the beams 120A, 120B, 140A, and 140B can be of equal lengths, while the lengths of beams 120A, 120B, 140A, and 140B are shorter than the lengths of beams 110A, 110B, 130A, and 130B. In an embodiment, beams 150A, 150B, 160A, and 160B are the shortest length beams in the kinematic structure.

As further shown, the kinematic structure comprises a plurality of joints/connections/links connecting respective beams and rods, as further described herein. An end A1-A of beam 110A connects to the upper support beam 107A at joint A1-A. The end of beam 120A and the joint that connects to upper support beam 107A is shown as A2-A. Similarly, the end of beam 110B and the joint that connects to upper support beam 107A is shown as A1-B. The end of beam 120B and the joint that connects to upper support beam 107A is shown as A2-B. Further, with regard to the end of the beam 130A and the joint that connects to the base support beam 105A is shown as B1-A. The end of beam 140A and the joint that connects to base support beam 105A is shown as B2-A. Similarly, the end of beam 130B and the joint that connects to base support beam 105B is shown as B1-B. The end of beam 140B and the joint that connects to base support beam 105B is shown as B2-B. The joints A1-A, A1-B, B1-A, and B1-B are pin joints (also known as revolute joints, hinge joints) that connect the respective ends of beams 110A, 110B, 130A, and 130B in a fixed location on respective support beams 105A, 105B, 107A, and 107B.

As further shown, base support beam 105A can include a slot 106A, and base support beam 105B can include a slot 106B. Also, upper support beam 107A can include a slot 108A and upper support beam 107B can include a slot 108B. As further described, the slots 106A-B and 108A-B are respectively located at the opposite ends of base support beams 105A-B and upper support beams 107A-B to that which the ends of beams 120A (joint A2-A), 120B (joint A2-B), 140A (joint B2-A), and 140B (joint B2-B) are connected. Further, rather than being fixed like pin joints A1-A, A1-B, B1-A, and B1-B, the joints A2-A, A2-B, B2-A, and B2-B are sliding joints (enabling sliding linear motion) that are able to slide back and forth in direction S-S in the respective slot, e.g., 106A, 106B, 108A, or 108B, in which the respective sliding joint A2-A, A2-B, B2-A, and B2-B is located. Hence, during motion of the suspension structure 100 (e.g., during application of mass 109, motion of the vehicle, and the like) the respective ends of beams 120A (A2-A), 120B (A2-B), 140A (B2-A), and 140B (B2-B) can slide back and forth along respective slots 106A-B and 108A-B. Hence, compression of the kinematic structure in the vertical direction can be compensated for by movement (expansion) of the kinematic structure in the horizontal directional, and by constraining the movement in the horizontal direction, motion in the vertical direction can also be constrained.

As shown, the kinematic structure further comprises beams 150A, 150B, 160A, and 160B. The first end B1-A of beam 130A is connected to the base support beam 105A, while the other end of beam 130A is connected to a first end of beam 150A, wherein beam 130A and beam 150A are connected at joint C2-A. The first end B1-B of beam 130B is connected to the base support beam 105B, while the other end of beam 130B is connected to a first end of beam 150B, wherein beam 130B and beam 150B are connected at joint C2-B.

Further, the first end A1-A of beam 110A is connected to the upper support beam 107A, while the other end of beam 110A is connected to a first end of beam 160A, wherein beam 110A and beam 160A are connected at joint C4-A. The first end A1-B of beam 110B is connected to the upper support beam 107B, while the other end of beam 110B is connected to a first end of beam 160B, wherein beam 110B and beam 160B are connected at joint C4-B.

Furthermore, a first end C2-A of beam 150A is connected to the end of support beam 130A, the other end of beam 150A is connected to beam 120A, wherein beam 150A and beam 120A are connected at joint D1-A. A first end C2-B of beam 150B is connected to the end of support beam 130B, the other end of beam 150B is connected to beam 120B, wherein beam 150B and beam 120B are connected at joint D1-B. A first end C4-A of beam 160A is connected to the end of support beam 110A, the other end of beam 160A is connected to beam 140A, wherein beam 160A and beam 140A are connected at joint D2-A. A first end C4-B of beam 160B is connected to the end of support beam 110B, the other end of beam 160B is connected to beam 140B, wherein beam 160B and beam 140B are connected at joint D2-B.

A joint E1-A is located where beams 110A and 120A cross, a joint E1-B is located where beams 110B and 120B cross, a joint E2-A is located where beams 130A and 140A cross, and a joint E2-B is located where beams 130B and 140B cross. As shown in FIG. 1D, the respective location of E1-A, E1-B, E2-A, and E2-B relative to the beams 110A/120A, 110B/120B, 130A/140A, and 130B/140B, is approximately the mid-point of M1 if the beams were creating a mirrored pantograph, as previously mentioned.

The joints C2-A, C2-B, C4-A, C4-B, D1-A, D1-B, D2-A, D2-B, E1-A, E1-B, E2-A, and E2-B are all pin joints.

As further shown in FIGS. 1A-1I, the respective joints as previously described are respectively connected by a bar, wherein the combination of bars, beams, and joints create the three-dimensional kinematic structure. A first end of bar 180 creates the fixed rotation joint of beam 110A and upper beam 107A at joint A1-A, while the opposite end of bar 180 creates the fixed rotation joint of beam 110B with upper beam 107B at joint A1-B.

A first end of bar 181 creates the sliding rotation joint of beam 120A and upper beam 107A at joint A2-A, while the opposite end of bar 181 creates the sliding rotation joint of beam 120B with upper beam 107B at joint A2-B.

A first end of bar 182 creates the fixed rotation joint of beam 130A and base beam 105A at joint B1-A, while the opposite end of bar 182 creates the fixed rotation joint of beam 130B with base beam 105B at joint B1-B.

A first end of bar 183 creates the sliding rotation joint of beam 140A and base beam 105A at joint B2-A, while the opposite end of bar 183 creates the sliding rotation joint of beam 140B with base beam 105B at joint B2-B.

A first end of bar 184 connects an end of beam 140A with an end of beam 120A at joint C1-A. The opposite end of bar 184 connects an end of beam 140B with an end of beam 120B at joint C1-B.

A first end of bar 185 connects an end of beam 130A with an end of beam 150A at joint C2-A. The opposite end of bar 185 connects an end of beam 130B with an end of beam 150B at joint C2-B.

A first end of bar 186 connects an end of beam 110A with an end of beam 160A at joint C4-A. The opposite end of bar 186 connects an end of beam 110B with an end of beam 160B at joint C4-B.

As shown in FIG. 1C, the end of beam 150A to beam 120A at joint D1-A can be connected by a bushing fixture that enables respective rotation of beams 150A and 120A relative to each other. Similarly, the other end of beam 150B connects to beam 120B at joint D1-B, e.g., via a bushing fixture. Further, an end of beam 160A connects to beam 140A at joint D2-A, e.g., via a bushing fixture, and similarly, the end of beam 160B connects to beam 140B at joint D2-B, e.g., via a bushing fixture.

As further shown, two bars 190-1 and 190-2 are used to create a frame (in conjunction with bars 180 and 182) with the upper support beams 107A and 107B, and with base support beams 105A and 105B. A first end of bar 190-1 is attached to base support beam 105A and the other end of bar 190-1 is attached to base support beam 105B. A first end of bar 190-2 is attached to upper support beam 107A and the other end of bar 190-2 is attached to upper support beam 107B. The bars 180-186, 190-1, and 190-2 are aligned parallel in direction D, and perpendicular with respect to the beams 105A, 105B, 107A, 107B, 110A, 110B, 120A, 120B, etc. Accordingly, respective joints located on respective ends of the bars 180-186, 190-1, and 190-2, are aligned in direction D-D, e.g., A1-A and A1-B are aligned in direction D-D, as are respective points, ends, etc., A2-A and A2-B, B1-A and B1-B, B2-A and B2-B, C1-A and C1-B, C2-A and C2-B, C3-A and C3-B, and C4-A and C4-B.

It is to be appreciated that tensioning/dampening of the suspension system 100 can be provided by a plurality of options, e.g., springs (e.g., metal, elastomer, and the like), a damper (e.g., a dampening pot, a dashpot, viscous dampening, and the like).

As shown in FIGS. 1A-1I, in an embodiment, tensioning of suspension system 100 can be performed by a pair of springs (in conjunction with a tensioning device) in combination with a damper (which can be incorporated into the tensioning device). A first end of a spring 191 is attached to bar 185, wherein, as previously described, bar 185 connects beam 130A to beam 150A at joint C2-A, and connects beam 130B to beam 150B at joint C2-B. Further, a first end of spring 192 is attached to bar 186, wherein, as previously described, bar 186 connects beam 110A with beam 160A at joint C4-A, and connects beam 110B with beam 160B at joint C4-B.

As further shown (e.g., in FIGS. 1E and 1G-1I), a tensioning device 193 is attached to the bar 184, wherein the tensioning device 193 is located on bar 184 between ends C1-A and C1-B of bar 184. The tensioning device 193 includes a thumbwheel 194 and an adjusting rod 199, and a motor 197 and a tensioning rod 195. A first end of the tensioning rod 195 is connected to the motor 197 (via a damper 198) and the second end of the tensioning rod 195 is connected to the connector 196 (connector 196 can be a coupler, an eyelet, or suchlike), wherein springs 191 and 192 are attached to the connector 196. A first end of the adjusting rod 199 is connected to the thumbwheel 194 and a second end of the adjusting rod 199 is coupled to the tensioning rod 195.

As shown in FIGS. 1A-1I, the second end of spring 191 is attached to the connector 196, and also a second end of the spring 192 is attached to the connector 196. The tensioning device 193 is aligned such that as the motor 197 is engaged, the tensioning rod 195 (e.g., as a threaded rod and coupler) can move back and forth with respect to the kinematic structure (e.g., along S-S of FIG. 1D). Withdrawal of the tensioning rod 195, and connector 196, causes the second end of spring 191 and the second end of spring 192 to be pulled away from bars 185 and 186 from which a first end of spring 191 and a first end of spring 192 are respectively attached. The motion of the second end of spring 191 and the second end of spring 192 away from bars 185 and 186 causes the tensioning device 193 to apply tension to the springs 191 and 192. Alternatively, movement of the tensioning rod 195 into the kinematic structure causes the second end of spring 191 and the second end of spring 192 to move towards bars 185 and 186 from which the first end of spring 191 and the first end of spring 192 are respectively attached. The motion of the second end of spring 191 and the second end of spring 192 towards the bars 185 and 186 causes the tensioning device 193 to reduce tension applied to the springs 191 and 192. As mentioned, the position of the tensioning rod 195 and the attached connector 196 can be changed with the motor 197, similarly, the position of the tensioning rod 195 and the attached connector 196 can be adjusted manually based upon turning the thumbwheel 194, which adjusts the adjusting rod 199, wherein the adjusting rod 199 is connected to, and changes position of the tensioning rod 195 and connector 196.

As can be appreciated from FIG. 2, as the mass 109 is applied to the suspension system 100, the distance H between the base support beams 105A & 105B and the upper support beams 107A & 107B is less than the distance H between base support beams 105A and 105B and the upper support beams 107A and 107B when a reduced mass is applied to the suspension system 100 (e.g., mass 109 has been removed or upward motion during driving a vehicle causes the mass 109 to lighten with respect to loading of the suspension system 100). Accordingly, in scenario (a), as the mass 109 increases, the distance W, e.g., between B1-A and B2-A, also increases. Similarly, in scenario (b), as the mass 109 reduces, the distance W, e.g., between B1-A and B2-A, correspondingly reduces. As further described, a tensioning system can constrain the increase in W during scenario (a) and a damper system can limit the decrease in W during scenario (b).

As shown in FIG. 2, the tensioning device 193, the tensioning rod 195, and springs 191 and 192 are located equidistant from the base support beams 105A-B and the upper support beams 107A-B such that a tensioning force k is applied to the midpoint of the kinematic structure.

With reference to FIG. 2, the following parameters are presented:

M=body mass/payload (e.g., mass 109).

y and z=displacement vectors of mass M (e.g., mass 109) relative to the base.

l=respective length of beam 110 (e.g., between joint A1 and joint C4) and beam 130 (e.g., between joint B1 and joint C2) comprising the respective upper and lower X-structures.

α=interior angle formed between the beam 130 and the horizontal base support (e.g., base support beam 105), in a triangle formed by beam 130, base support beam 105, and beam 140.

β=large interior angle between the beams 130 and 140, in a triangle formed by beam 130, beam 140, and base support beam 105. It is to be noted that while α and β are referenced with beams 130, 140, and 105, the angles are repeated throughout the kinematic structure with regard to location of joints A1-A2, B1-B2, and C1-C3.

H=total height of suspension system 100 (e.g., from a lower surface of base support beams 105A-B (e.g., base plane of FIG. 1A) and an upper surface of upper support beams 107A-B (e.g., upper plane of FIG. 1A), as indicated on FIGS. 1A, 1D, and 2.

W=width of suspension system 100 (e.g., respective distance between joints A1-A to A2-A, A1-B to A2-B, B1-A to B2-A, and B1-B to B2-B).

As mentioned, in an embodiment, springs 190 and 191 and dampers can be installed to respectively connect C1 to C2 and C4, and C3. Per Hooke's Law, the force exerted by a spring on an object(s) attached to its end(s) is proportional to the spring's change in length away from its equilibrium length and is always directed towards its equilibrium position, hence, F=−kx. The proportional constant k is the spring constant, and is a measure of the spring's stiffness.

As previously mentioned, the height H of the suspension system 100 can be set manually, e.g., using thumbwheel 194. However, in another embodiment, the height H can be controlled automatically, e.g., to further attenuate vibrational forces generated during motion of the vehicle to which the suspension system 100 is attached. With reference to FIG. 2, the degree of tension applied to the springs 191 and 192 (and damper 198) can be adjusted automatically by a controller 171, having algorithms 172 stored thereon, changing the height H of the suspension system 100 based upon position measurements received from sensor 173. The sensor 173 can be configured to determine the height of a specific point of the suspension system 100. For example, per an embodiment illustrated in FIG. 2, the sensor 173 can be located at a base support beam 105A, wherein the sensor 173 is configured to emit a beam 174 (e.g., infrared light, or other suitable technology) aimed at the underside US of the upper support beam 107A. Based upon time of flight, or similar measurement, the controller 171 can utilize algorithms 172 to determine the current height Hc relative to a desired height H (e.g., for a given mass 109). The controller 171 can be configured to adjust the height H of the suspension system 100 by controlling the motor 197 to apply any required tension/release to the springs 191 and 192 (and damper 198). In an alternative embodiment, the sensor 173 can be configured to determine an angle between a pair of beams, e.g., angle β between beams 130A and 140A (per FIG. 2), and the controller 171 controls the angle β by adjusting the tension/release to the springs 191 and 192 (and damper 198) with motor 197. The automated adjustment process can continue throughout motion of the vehicle.

The various beams and bars described herein can be formed from any suitable material having a desired strength to weight ratio, e.g., aluminum, aluminum alloy, titanium, carbon fiber, fiber glass, polymer, steel, pressed metal, cast metal, forged metal, and the like. The various bushings can be formed from any suitable material, e.g., polymer, metal, ceramic, etc. The respective connections and fittings can be manufactured from any suitable material, e.g., metal screws, metal washers, polymer washers, and the like.

2. Theoretical Analysis

Figure 3:
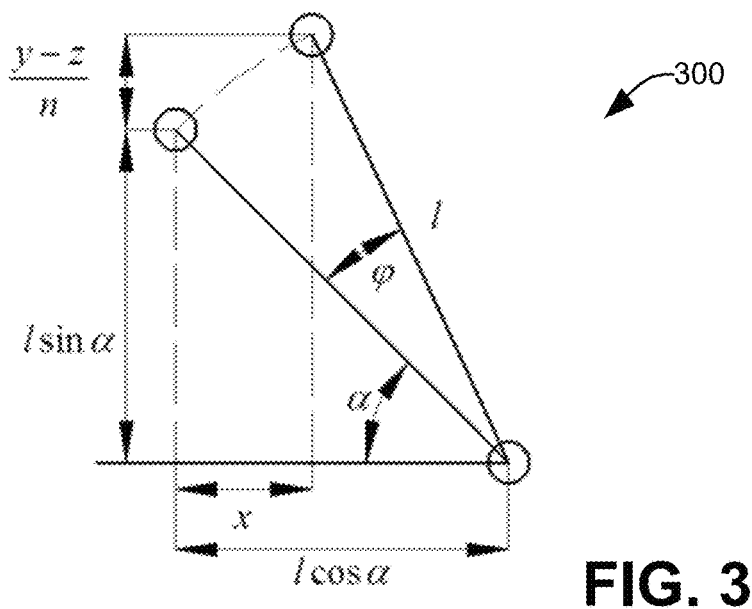
FIG. 3 presents a mathematical model illustrating the relationship between φ, the rotation of the joints, with x, the horizontal displacement of springs, in accordance with various aspects and implementations of the subject disclosure.

FIG. 3 presents a mathematical model 300 illustrating the relationship between φ, the rotation of the joints (where φ is the angle swept from an initial angle α), with x, the horizontal displacement of the springs (e.g., springs 191 and 192). Owing to the relative motion (e.g., vertical displacement resulting from vibration caused by external energy incident upon the suspension system 100 during motion of a vehicle to which the suspension system 100 is attached) of the upper support beams 107A-B (FIG. 2, displacement vector z) with respect to base support beams 105A-B (FIG. 2, displacement vector y) the horizontal displacement of the spring, x, (e.g., of springs 191 and 192) is expressed per Eqn. 1:

$$x = l \cos \alpha - \sqrt{l^2 - (l\sin\alpha + \hat{y}/n)^2} \qquad \text{Eqn. 1}$$

and φ, the rotation of the joints, is expressed, per Eqn. 2:

$$\varphi = \arctan \frac{l \sin \alpha + \hat{y}/n}{\sqrt{l^2 - (l\sin\alpha + \hat{y}/n)^2}} - \alpha \qquad \text{Eqn. 2}$$

The static supporting force F of the seat suspension presented in suspension system 100 is expressed per Eqn. 3:

$$F = kx \tan(\alpha + \varphi) \qquad \text{Eqn. 3}$$

Substituting Eqn. 1 (x) and Eqn. 2 (φ) into Eqn. 3 (F), gives, per Eqn 4:

$$F = k\left(l \cos\alpha - \sqrt{l^2 - (l\sin\alpha + \hat{y}/n)^2}\right) \frac{l\sin\alpha + \hat{y}/n}{\sqrt{l^2 - (l\sin\alpha + \hat{y}/n)^2}} \qquad \text{Eqn. 4}$$

Figure 4A:
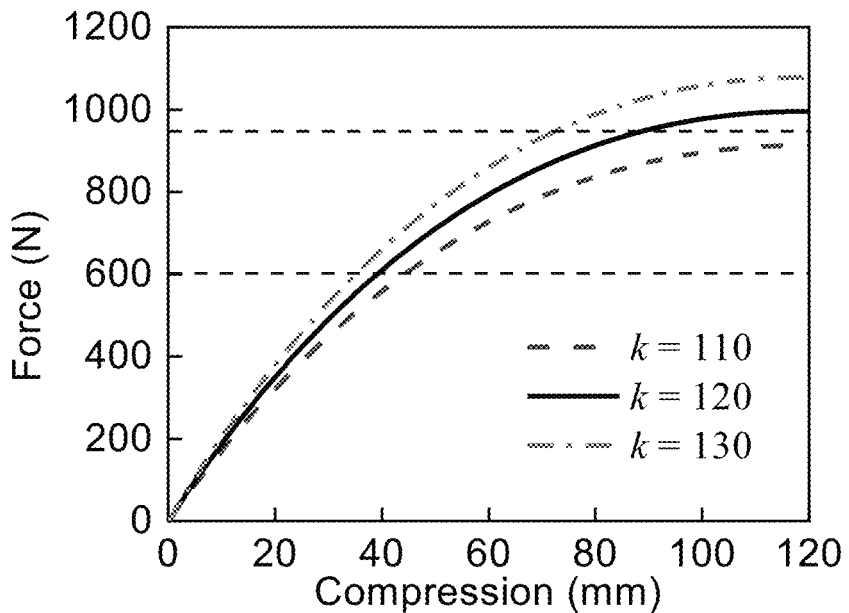
FIGS. 4A-C present force-displacement curves for a plurality of conditions/parameters, in accordance with various aspects and implementations of the subject disclosure.
Figure 4B:
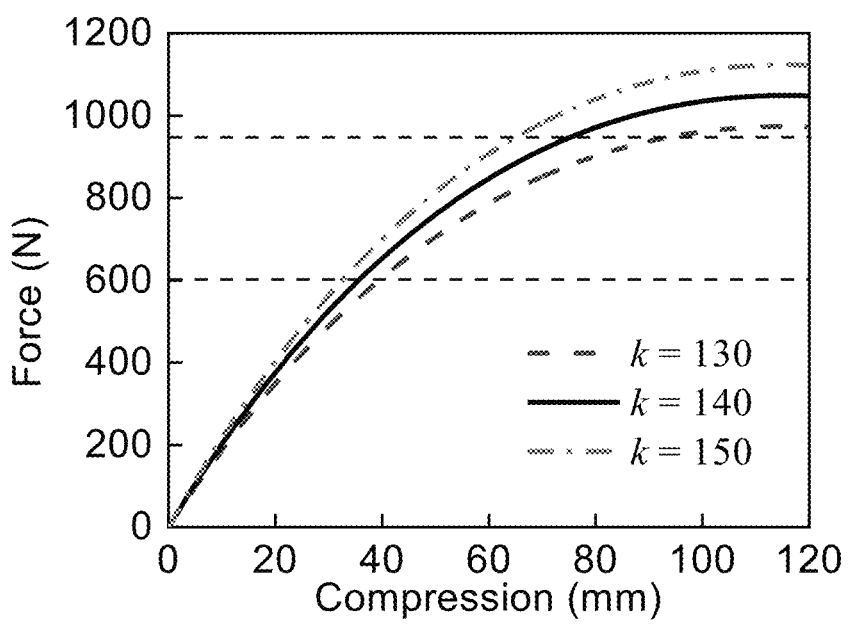
Figure 4C:
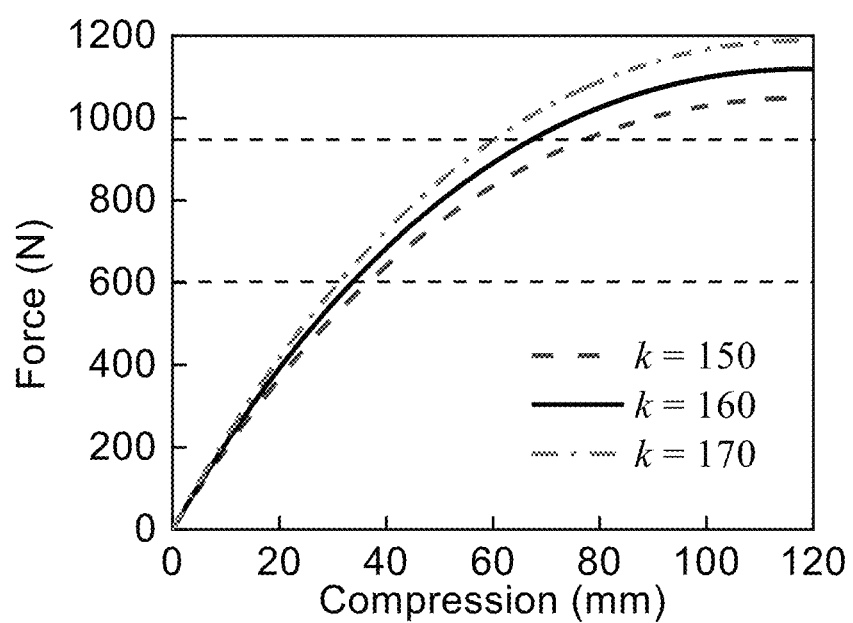

Per the foregoing, the static supporting force (F) versus the compressed displacement of H is shown in FIGS. 4A-C with the according parameter values presented in TABLE 1.

TABLE 1

Example dimensions for respective components of suspension system 100.

| Name | Spring Stiffness k (N/mm) | Rod Length L (mm) | Initial Angle a (deg) | Initial Spring Length (mm) |
|---|---|---|---|---|
| Example A | 120 | 300 | 30 | 259.8 |
| Example B | 140 | 300 | 29 | 262.4 |
| Example C | 160 | 280 | 29 | 244.9 |

The performance of the suspension system 100 varies based upon different positions and angles of the respective components comprising the seat suspension system. Examples A-C presented in TABLE 1 are further developed utilizing 3 different positions: low level, middle level and high level.

TABLE 2A

Properties of the suspension system 100 at different positions utilizing parameters from EXAMPLE A.

| Level | Angle α (deg) | Angle β (deg) | Height (mm) | Width (mm) | Force (N) | Extension (mm) |
|---|---|---|---|---|---|---|
| Low | 15 | 150 | 155.3 | 289.8 | 97.6 | 29.9 |
| Middle | 20 | 140 | 205.2 | 281.9 | 97.1 | 22.1 |
| High | 25 | 130 | 253.6 | 271.9 | 68.1 | 12.1 |

FIG. 4A is a Force-displacement curve utilizing parameters from EXAMPLE A with measurements from TABLE 2A.

TABLE 2B

Properties of the suspension system 100 at different positions utilizing parameters from EXAMPLE B.

| Level | Angle α (deg) | Angle β (deg) | Height (mm) | Width (mm) | Force (N) | Extension (mm) |
|---|---|---|---|---|---|---|
| Low | 15 | 150 | 155.3 | 289.8 | 102.8 | 27.97 |
| Middle | 20 | 140 | 205.2 | 281.9 | 99.2 | 20.63 |
| High | 25 | 130 | 253.6 | 271.9 | 61.8 | 11.28 |

FIG. 4B is a Force-displacement curve utilizing parameters from EXAMPLE B with measurements from TABLE 2B.

TABLE 2C

Properties of the suspension system 100 at different positions utilizing parameters from EXAMPLE C.

| Level | Angle α (deg) | Angle β (deg) | Height (mm) | Width (mm) | Force (N) | Extension (mm) |
|---|---|---|---|---|---|---|
| Low | 15 | 150 | 144.9 | 270.5 | 109.6 | 25.6 |
| Middle | 20 | 140 | 191.5 | 263.1 | 106.1 | 18.2 |
| High | 25 | 130 | 236.7 | 253.8 | 66.1 | 8.9 |

FIG. 4C is a Force-displacement curve utilizing parameters from EXAMPLE C with measurements from TABLE 2C.

From the foregoing, it is readily apparent that the properties of the proposed passive bio-inspired seat suspension are adjustable via several easy-to-tune structural parameters and consequently leads to constant natural frequency and guaranteed performance irrespective of the body mass (payload) and seated height. The outstanding vibration isolation performance with appropriate parameter settings are investigated in the following section.

3. Modelling and Dynamic Analysis

The displacement transmissibility of the proposed passive bio-inspired seat suspension is studied to evaluated vibration isolation performance under different parameter setting.

The translational kinematic energy T of the suspension system 100 (e.g., generated during motion of a vehicle to which the suspension system 100 attached) can be written per Eqn. 5:

$$T = \frac{1}{2}M\dot{y}^2 \quad \text{Eqn. 5}$$

The potential energy V of the isolation system (spring or dashpot) can be obtained per Eqn. 6:

$$V = \frac{1}{2}kx^2 + Mgy \quad \text{Eqn. 6}$$

where x is the horizontal displacement of the spring (e.g., springs 190 and 191). The equation of motion can be determined by the Lagrange principle, per Eqn. 7:

$$\frac{d}{dt}\left(\frac{\partial L}{\partial \dot{y}}\right) - \frac{\partial L}{\partial y} = -D \quad \text{Eqn. 7}$$

The dissipated energy D by the damping system (e.g., damper 198) is defined per Eqn. 8:

$$D = c\dot{x} \quad \text{Eqn. 8}$$

where c is the damping coefficient of the horizontal motion (e.g., along direction S-S on FIG. 1D). The Lagrangian L is expressed per Eqn. 9:

$$L = T - V \quad \text{Eqn. 9}$$

Substituting Eqns. 5 and 6 into Eqn. 9, the Lagrangian L is obtained per Eqn. 10:

$$L = \frac{1}{2}M\dot{y}^2 - \frac{1}{2}kx^2 - Mgy \quad \text{Eqn. 10}$$

Further, by substituting Eqns. 8 and 10 into the Lagrange principle presented in Eqn. 7, the equation of motion for the suspension system 100 can be obtained per Eqn. 11:

$$M\ddot{y} + kx + Mg = -c\dot{x} \quad \text{Eqn. 11}$$

where the horizontal velocity $\dot{x}$ is defined per Eqn. 12:

$$\dot{x} = (\partial x/\partial \dot{y})(\partial \dot{y}/\partial t) \quad \text{Eqn. 12}$$

For convenience, nonlinear functions $f_1$ and $f_2$ can be defined, per Eqns. 13 and 14, as:

$$f_1(\dot{y}) = x\frac{\partial x}{\partial \dot{y}}\frac{\partial \dot{y}}{\partial y} \quad \text{Eqn. 13}$$

$$f_2(\dot{y}) = \frac{\partial x}{\partial \dot{y}} \quad \text{Eqn. 14}$$

Thus, substituting Eqns. 12 and 14 into Eqn. 11, then the equation of motion for the suspension system 100 presented herein, is defined per Eqn. 15:

$$M\ddot{y} + kf_1(\dot{y}) + cf_2(\dot{y})\dot{y} + Mg = -M\ddot{z} \quad \text{Eqn. 15}$$

The functions $f_1$ (Eqn. 13) and $f_2$ (Eqn. 14) can be respectively expanded by Taylor series at zero equilibrium, per Eqns. 16 and 17, as:

$$F_1(\dot{y}) = \lambda_0 + \lambda_1\dot{y} + \lambda_2\dot{y}^2 + \lambda_3\dot{y}^3 + \lambda_4\dot{y}^4 + \lambda_5\dot{y}^5 \quad \text{Eqn. 16}$$

$$F_2(\dot{y}) = \lambda_6 + \lambda_7\dot{y} + \lambda_8\dot{y}^2 + \lambda_9\dot{y}^3 + \lambda_{10}\dot{y}^4 + \lambda_{11}\dot{y}^5 \quad \text{Eqn. 17}$$

where the coefficients $\lambda_0$ to $\lambda_{11}$ are presented in "Appendix A" herein. Replacing the $f_1$ and $f_2$ by $F_1$ and $F_2$ in Eqn. 15, the equation of motion of the suspension system 100 is given in Eqn. 18:

$$M\ddot{y} + kF_1(\dot{y}) + cF_2(\dot{y})\dot{y} + Mg = -M\ddot{z} \quad \text{Eqn.18}$$

where the base excitation $z = z_0 \cos(\omega t + \phi)$. With the Harmonic Balance Method (HBM), the solution of Eqn. 18 can be set as:

$$\dot{y} = a\cos(\omega t). \quad \text{Eqn. 18A}$$

where the equations for a and ϕ are provided in "Appendix B". The displacement transmissibility $T_d$ can be obtained per Eqn. 19:

$$T_d = \left| \frac{\sqrt{a^2 + z_0^2 + 2az_0 \cos \phi}}{z_0} \right| \quad \text{Eqn. 19}$$

Per Eqn. 19, the displacement transmissibility of the suspension system 100 is determined by a and ϕ.

Figure 5A:
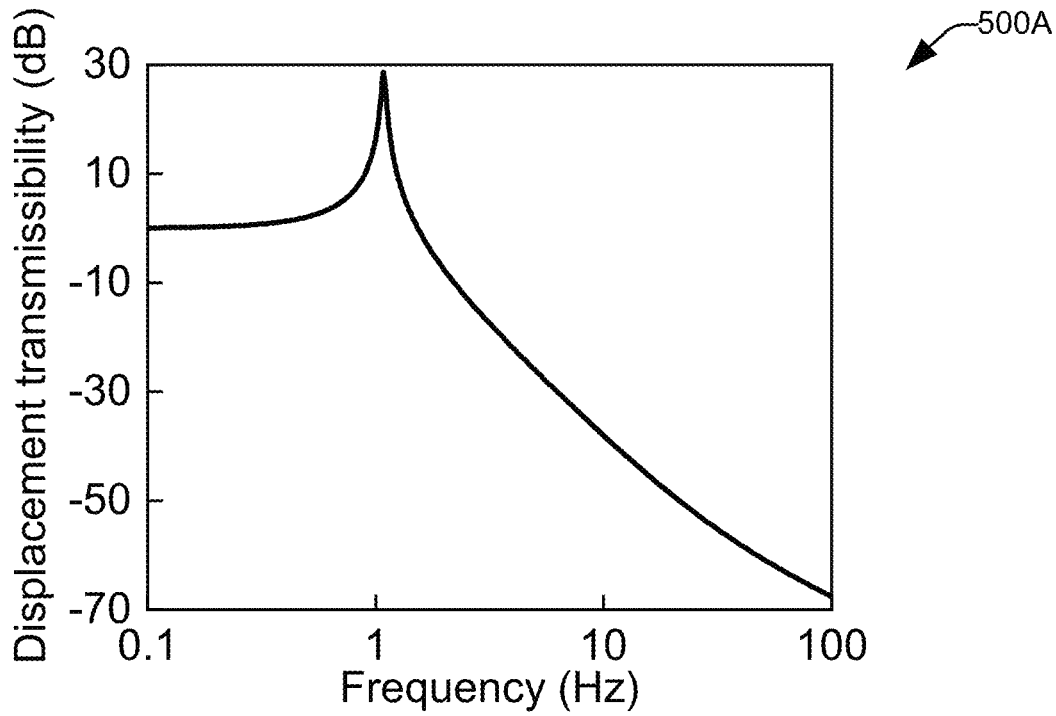
FIGS. 5A-C presents respective charts depicting a benchmark example of Displacement Transmissibility (dB) versus Frequency (Hz), as well as effects of angle α and spring stiffness k, in accordance with various aspects and implementations of the subject disclosure.

FIG. 5A, Graph 500A, presents a benchmark example of Displacement Transmissibility (dB) versus Frequency (Hz) of the suspension system 100, wherein the values presented were obtained with the parameters presented below in TABLE 3. Displacement transmissibility is the displacement of a mass (e.g., mass 109) as a result of a displacement of a base (e.g., base support beams 105A-B) as transmitted through a vehicle floor when a vehicle is in motion navigating terrain.

TABLE 3

Parameters Utilized to Generate Graph 500A, as shown in FIG. 5A.

| Parameter | Symbols | Values | Units |
|---|---|---|---|
| Body mass (payload) | M | 60-95 | kg |
| Stiffness | k | 120 | N/mm |
| Rod length | l | 300 | mm |
| Angle α | α | 25 | degree |
| Angle β | β | 130 | degree |

FIG. 5A, Graph 500A, illustrates that suspension system 100 can easily achieve an ultra-low natural frequency (approx. 1 Hz) accompanied with a satisfactorily low transmissibility over a broadband frequency range. Further, the nonlinear properties can be adjustable via several easy-to-tune structural parameters. The resonant frequency is determined complicatedly by several factors including angle α and spring stiffness k.

To aid appreciation of the various benefits in utilizing suspension system 100, the following presents a parametric influence analysis (an explicit expression can be difficult to obtain) demonstrating the sensitivity of the displacement transmissibility to include angle α and spring stiffness k.

Figure 5B:
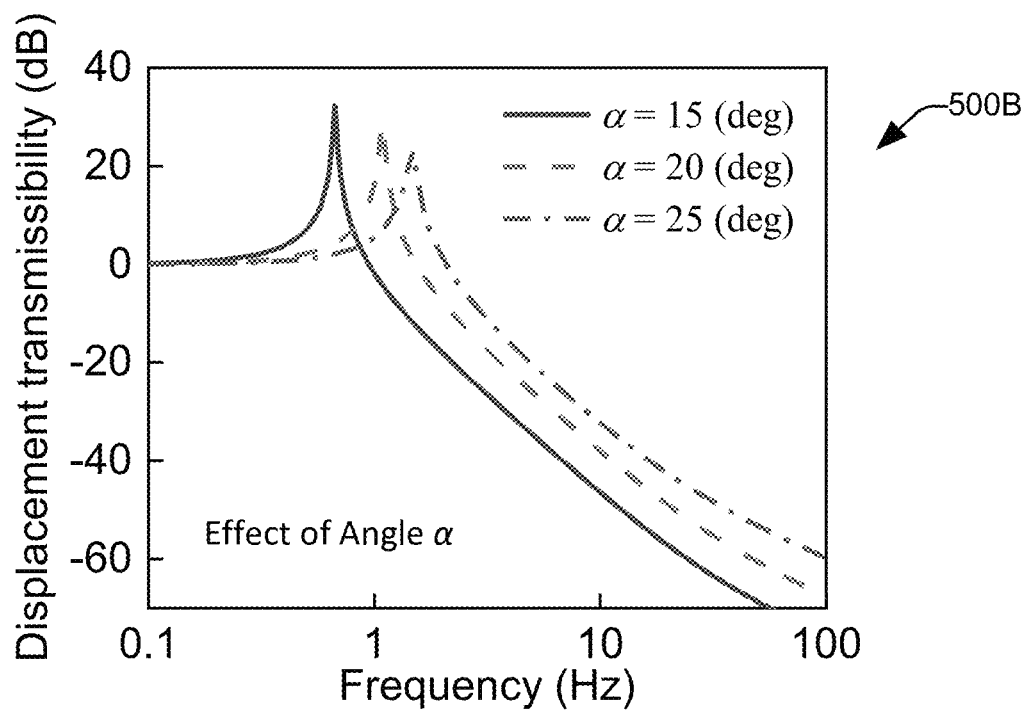

FIG. 5B, chart 500B, presents the effect of the angle α on displacement transmissibility of the suspension system 100. It is readily apparent from FIG. 5B, that with the angle α varying from 15 degrees to 25 degrees, the resonant frequency and the displacement transmissibility increase. The results indicate the vibration isolation performance of the suspension system 100 is improved when using small angle α. However, it should be noted that, the peak of the resonant frequency is increased by smaller stiffness, which is not expected in practice especially for the system with the excitation near the resonant frequency.

Figure 5C:
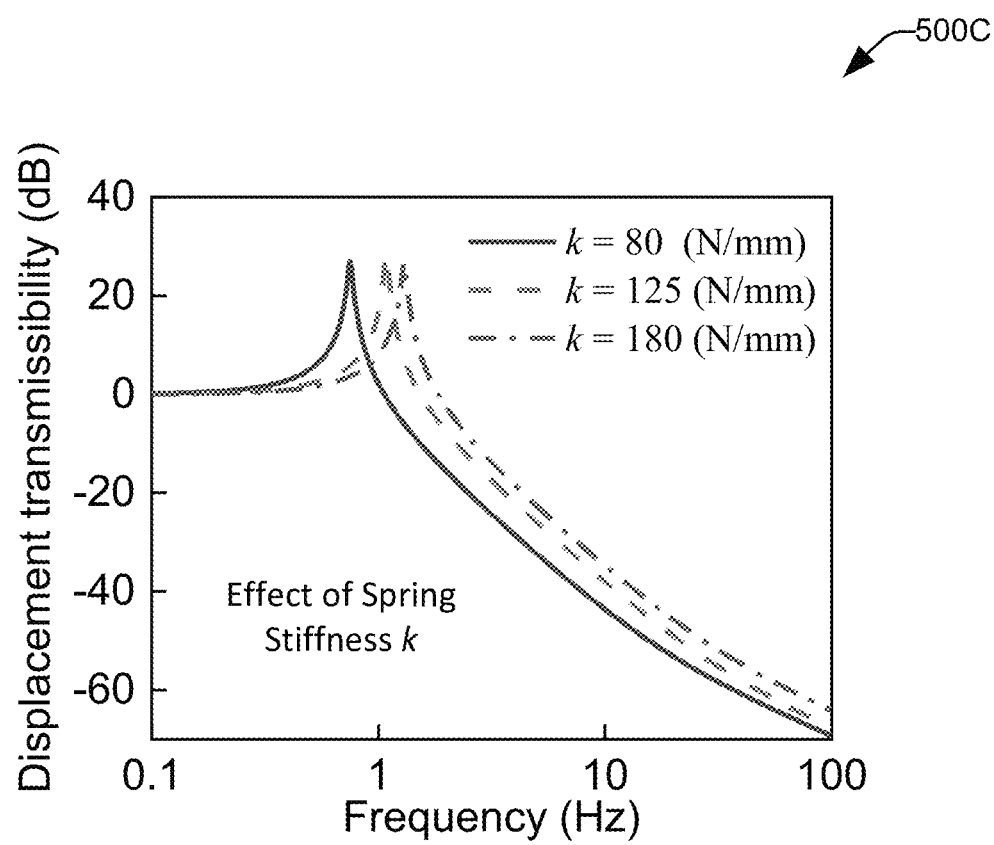

FIG. 5C, chart 500C, presents the effect of the spring stiffness k (e.g., of springs 191 and 192) on displacement transmissibility of the suspension system 100. It is readily apparent from FIG. 5C that as stiffness k reduces, both the resonant frequency and displacement transmissibility also decrease. The results indicate that the vibration isolation performance of the suspension system 100 is improved when utilizing a smaller spring stiffness k.

From the foregoing, it is apparent that the displacement transmissibility of the suspension system 100 is determined significantly by the tunable structural parameters. Accordingly, excellent vibration isolation performance can be achieved.

4. Experimental Results

The following presents results from a series of experiments conducted with suspension system 100 under real road excitation conditions. The experiments utilized different body mass (payload), seat height and velocity.

To support the various embodiments presented herein, six operational conditions were assessed, as listed in Conditions 1-6 in TABLE 4, below:

TABLE 4

Respective Mass and Vehicle Velocity utilized in the experiments.

| Names | Mass (kg) | Velocity (m/s) | Height (mm) |
|---|---|---|---|
| Condition 1 | 60 | 1.0 | 229 |
| Condition 2 | 60 | 1.6 | 229 |
| Condition 3 | 60 | 1.0 | 233 |
| Condition 4 | 60 | 1.6 | 233 |
| Condition 5 | 90 | 1.6 | 233 |
| Condition 6 | 90 | 2.9 | 233 |

For each condition presented in TABLE 4, the vibration data of mass and base were measured by utilizing two accelerometers, per the ISO 2631-1 testing standard. A time domain signal was obtained, which was transformed to frequency domain via Fast Fourier Transform (FFT). In order to further demonstrate the performance of the suspension system 100, the transmissibility (e.g., the ratio of output spectrum of mass to that of the base) is also calculated. The results of time domain data, FFT data, and transmissibility are presented with regard to different components, below.

4.1. Effect of the Body Mass (Payload)

To evaluate the effect of the body mass (payload) (e.g., mass 109) on the vibration isolation performance, comparison tests were performed with payloads of 60 kg (Conditions 1-4) and 90 kg (Conditions 5-6) respectively. Other test parameters of the suspension system 100, such as the seat height and the velocity, remained constant during these. tests. FIGS. 6A-C and FIGS. 7A-C present the respective test results.

FIGS. 6A-C present respective results when the suspension system 100 was loaded with a payload of 60 kg and moved with a velocity of 1.6 m/s. During these tests, the seat height was set to 233 mm. The acceleration amplitudes and transmissibility results in a) the time domain and b) the frequency domain are presented in FIGS. 6A-C.

FIGS. 7A-C present respective results obtained when testing of suspension system 100 is conducted with a payload of 90 kg, and dragged with a velocity of 1.6 m/s. During these tests, the seat height is set to 233 mm. The acceleration amplitudes and transmissibility results in a) time domain and b) frequency domain are presented in FIGS. 7A-C.

As shown in FIGS. 6A-C and 7A-C, comparison of the respective acceleration amplitudes between the base and the payload illustrates the suspension system 100 exhibiting excellent vibration isolation performance. According to the transmissibility, the natural frequency of the suspension system 100 is approximately 1 Hz. As shown, when a mass of 90 kg is applied to the suspension system 100, the suspension system 100 exhibits better vibration isolation performance (due to the lower resonance frequency) than when a mass of 60 kg is applied to the suspension system 100. Further, according to the transmissibility results, a second resonance peak is present at around 20 Hz, which is related to the second-order modal frequency. It should be noted that the second resonance peak can be easily suppressed by the vehicle suspension being firmly fixed between the chassis and the seat suspension.

4.2. Effect of the Seat Height

To evaluate the effect of the seat height on the vibration isolation performance, comparison tests were performed with the seat height at 229 mm and 233 mm respectively. Other test parameters of the suspension system 100, such as the body mass (payload) and the velocity, remain constant during the tests. FIGS. 8A-C and 9A-C present the respective test results.

FIGS. 8A-C present respective results when the suspension system 100 was loaded with the payload of 60 kg and dragged with the velocity of 1.6 m/s. During these tests, the seat height is set to 229 mm. The acceleration amplitudes and transmissibility results in a) the time domain and b) the frequency domain are presented in FIGS. 8A-C.

FIGS. 9A-C present respective results when the suspension system 100 had a seat height setting of 233 mm. Suspension system 100 was dragged with a velocity of 1.6 m/s and a payload of 60 kg, the same settings as used in the tests presented in FIGS. 8A-C. The acceleration amplitudes and transmissibility results in a) the time domain and b) the frequency domain are presented in FIGS. 9A-C.

As shown in FIGS. 8A-C and 9A-C, comparison of the respective acceleration amplitudes between the base and the payload indicates the suspension system 100 can easily achieve an ultra-low natural frequency (around 1 Hz). The nonlinear characteristics of the suspension system 100 consequently leads to constant natural frequency and guaranteed performance regardless of seat height. Further, the experimental results validate the theoretical analysis (as previously described herein), demonstrating the suspension system 100 has a low transmissibility over a broadband frequency range and effectively isolates the vibration excitations from the base. It is to be noted that the previously mentioned second mode frequency of around 20 Hz is not clearly present in the conditions presented in FIGS. 8A-C and FIGS. 9A-C, (particularly with a seat height of 229 m), indicating suspension system 100 is able to suppress the second resonant peak.

4.3. Effect of a Rubber Pad

The effect of utilizing a rubber pad on the seat suspension vibration isolation performance was investigated, per the following experiments. The accelerations and transmissibility are measured on the suspension system 100 with or without the rubber pad between the seat structure (e.g., attached to the upper support beams 107A-B) and the body mass (e.g., mass 109) respectively. Different velocities (2 m/s and 2.9 m/s) are involved to demonstrate the effect under various conditions. The other parameters are set to Payload 90 kg, seat height 233 mm. Test results are shown in FIGS. 10A-C to 13A-C.

FIGS. 10A-C present results of tests performed with a rubber pad with Payload=90 kg, seat height=233 mm, and velocity=2 m/s.

FIGS. 11A-C present results of tests performed with a rubber pad with Payload=90 kg, seat height=233 mm, and velocity=2.9 m/s.

FIGS. 12A-C present results of tests performed without a rubber pad with Payload=90 kg, seat height=233 mm, and velocity=2 m/s.

FIGS. 13A-C present results of tests performed without a rubber pad with Payload 90 kg, seat height=233 mm, and velocity=2.9 m/s.

As shown in FIGS. 10A-C to 13A-C, comparison of the acceleration amplitudes between the base and the body mass (payload) in time domain indicates the suspension system 100 (with or without rubber pad) has excellent vibration isolation performance. As further shown by the respective transmissibility values, the suspension system 100 can easily achieve an ultra-low natural frequency (e.g., approximately 1 Hz) and satisfactory low transmissibility over a broadband frequency range. Further, based on a comparison of the respective acceleration amplitudes and transmissibility in the frequency domain, the suspension system 100 with rubber pad illustrates better vibration isolation at higher frequency range (over 50 Hz) than the tests performed where the suspension system 100 did not have a rubber pad. The test results demonstrate that viscoelastic material, such as rubber, shows benefit in achieving high frequency vibration isolation. Accordingly, a combination of the suspension system 100 and a rubber pad between the seat structure and the body mass (e.g., mass 109) achieves superior vibration isolation performance both in the low and high frequency ranges than can be achieved with existing seat suspensions such as traditional cross-linkage mechanisms with air spring or active controlled seat suspensions. Further, as shown, the second resonance peak at around 20 Hz, which is related to the second-order modal frequency (as previously mentioned) can be easily suppressed by the vehicle suspension and the anti-vibration system fixed between the chassis and the seat.

4.4. Effect of Velocity

Comparison tests were conducted with low and high velocities to demonstrate the effect of velocity on the vibration isolation performance of the suspension system 100. Tests were conducted with respective velocities of 1.7 m/s, 1.4 m/s and 1 m/s. Other parameters were kept constant, where body mass (payload)=60 kg, seat height=229 mm. The acceleration amplitudes and transmissibility results in a) the time domain and b) the frequency domain are shown in FIGS. 14A-C to 16A-C.

FIGS. 14A-C present test results with velocity=1.7 m/s, payload=60 kg, seat height=229 mm.

FIGS. 15A-C present test results with velocity=1.4 m/s, payload=60 kg, seat height=229 mm.

FIGS. 16A-C present test results with velocity=1 m/s, payload=60 kg, seat height=229 mm.

As shown in FIGS. 14A-C to 16A-C, the natural frequency of the suspension system 100 is approximately 1 Hz. Furthermore, the suspension system 100 exhibits superior vibration isolation performance at both low velocity and high velocity. Though the acceleration amplitudes of the base are larger at the high velocity than at the low velocity, the acceleration of the body mass (e.g., mass 109) has a low amplitude in all frequency ranges. The low amplitude across all frequency ranges is beneficial for vehicles experiencing varied operational velocities and working conditions. Further, the second-order modal frequency at around 20 Hz in transmissibility is not distinct compared to results of tests conducted with a height of 233 mm, and can be easily suppressed by the vehicle suspension and the anti-vibration system fixed between the chassis and the seat 4.5. Ride Quality Evaluation According to ISO 2631-1, the frequency component of vibration affects health, comfort, perception, motion sickness, etc. Therefore, the frequency weighting root-mean-square (RMS) acceleration, which is calculated by the data of 1/3 octave band, is used to assess vibration.

$$a_w = \left[\sum_i (W_i a_i)^2\right]^{-\frac{1}{2}} \qquad \text{Eqn. 20}$$

where, per Eqn. 20:

$a_w$=frequency weighting RMS acceleration;
$W_i$=the weighting factor of the $i^{th}$ 1/3 octave band; and
$a_i$=the RMS acceleration of the $i^{th}$ 1/3 octave band.

For comparison, the RMS acceleration without weighted calculation is also computed. The results of both kinds of RMS acceleration are presented in TABLE 5:

TABLE 5

RMS ACCELERATION VALUES

| | RMS acceleration 1[a] | | | RMS acceleration 2[b] | | |
|---|---|---|---|---|---|---|
| Param. | Mass | Base | Ratio avg. (Mass/Base) | Mass | Base | Ratio avg. (Mass/Base) |
| Cond. 1 | 0.156593 | 3.344645 | 0.046819 ± 0.0209 | 74.9690 | 4315.1623 | 0.017373 ± 0.00656 |
| Cond. 2 | 0.266151 | 13.15889 | 0.020225 ± 0.0105 | 269.9783 | 29362.540 | 0.009194 ± 0.00881 |
| Cond. 3 | 0.150869 | 2.96922 | 0.050811 ± 0.0131 | 226.897 | 8934.7 | 0.025394 ± 0.01271 |
| Cond. 4 | 0.208231 | 20.6403 | 0.010089 ± 0.0022 | 287.749 | 44014.9 | 0.006538 ± 0.00268 |
| Cond. 5 | 4.132168 | 12.9161 | 0.319922 ± 0.0394 | 3454.540 | 32426.3 | 0.106534 ± 0.01372 |
| Cond. 6 | 5.212120 | 34.2162 | 0.152328 ± 0.0089 | 5174.113 | 116272.8 | 0.044499 ± 0.00483 |

([a]frequency weighting RMS acceleration; and [b]RMS acceleration without weighted calculation).

As shown in TABLE 5, suspension system 100 demonstrates excellent vibration isolation performance. Over 90% of the vibrations are isolated. Furthermore, suspension system 100 provides vibration isolation when a variety body mass payloads and a range of velocities are encountered under different conditions.

Methods

Figure 17:
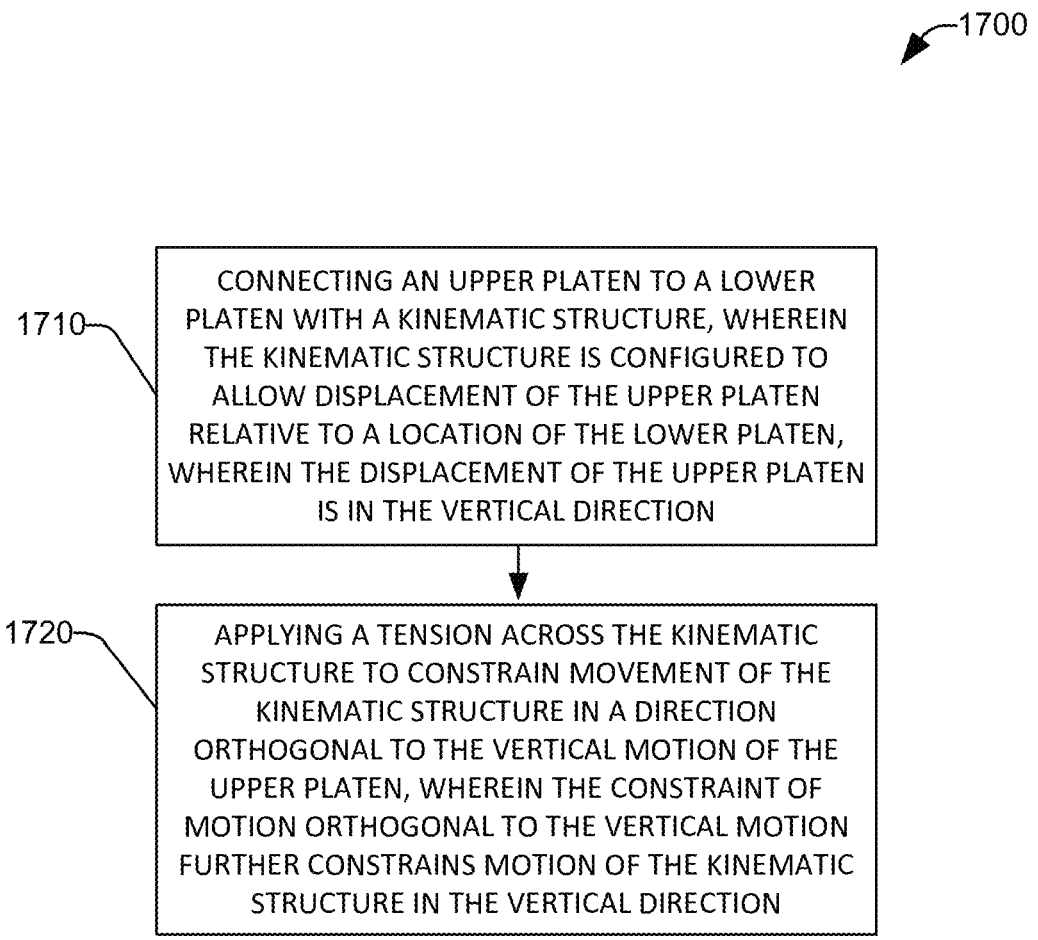
FIG. 17 is a flow diagram presenting a methodology for construction and utilization of an anti-vibration system configured to attenuate vibrational energy, in accordance with various aspects and implementations of the subject disclosure.

FIG. 17 illustrates a method 1700 for constructing and utilizing an anti-vibration structure. As previously described, during motion of a vehicle, energy can be transferred from the road surface/suspension into a structure, e.g., a driver's seat. In an aspect, the energy transferred to the seat structure can manifest itself in the form of vibrational energy throughout the structure.

At 1710, a kinematic structure is utilized to connect a pair of base beams (e.g., configured to be attached to a base platen such as a floor of a vehicle) with a pair of upper beams (e.g., configured to be attached to an upper platen such as a seat). The base beams are aligned in a first plane and the upper beams are aligned in a second plane, wherein the first plane and second plane are parallel, or substantially parallel. The kinematic structure comprises beams and rods, and wherein movement of the kinematic structure facilitates a first displacement of the upper beams along a first axis, a vertical axis, relative to a position of the base beams.

At 1720, a tensioning force is applied across the kinematic structure across a second axis, orthogonal to the vertical axis, to constrain movement of the kinematic structure along the second axis. Constraint of motion of the kinematic structure along the second axis can attenuate vibrational motion of the kinematic structure along the first axis. In an embodiment, the tensioning force can be applied by at least one spring along the second axis, wherein the tensioning force is a resistance of the at least one spring to extension of its length along the second axis. In another embodiment, a damper system can be utilized in series with the at least one spring, wherein the damper system is configured to dissipate energy released by the at least one spring during extension or contraction/relaxation of the at least one spring along the second axis. In an embodiment, the constraining of movement of the kinematic structure along the second axis relative to the attenuation of vibrational motion of the kinematic structure along the first axis is defined by a non-linear relationship. In a further embodiment, the stiffness of the kinematic structure increases non-linearly with the amount of tension applied relative to displacement of the upper beams along the first axis relative to the position of the base beams. In another embodiment, the kinematic structure is configured to constrain motion along the first axis to a single degree of freedom.

Figure 18:
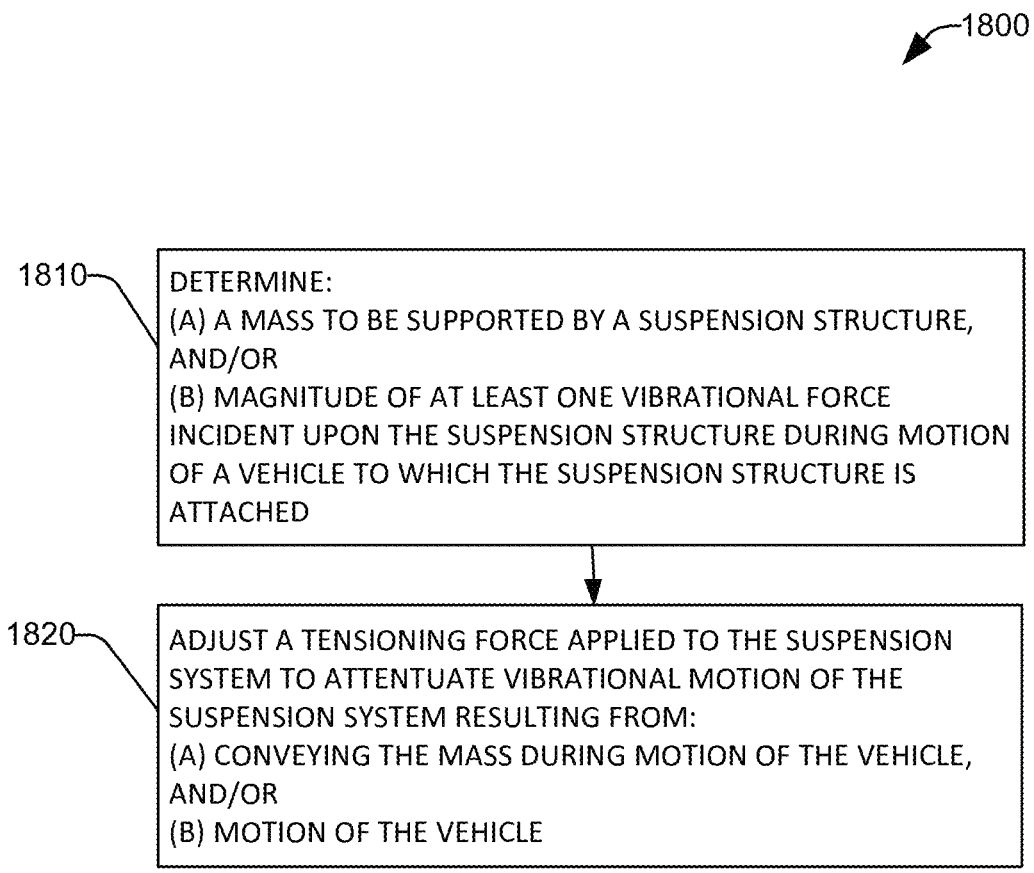
FIG. 18 is a flow diagram presenting a methodology for adjusting a tensioning force applied to an anti-vibration system to attenuate vibrational energy, in accordance with various aspects and implementations of the subject disclosure.

FIG. 18 illustrates a method 1800 for adjusting tension applied to an anti-vibration structure, wherein the tension can be adjusted to compensate for a mass supported by the anti-vibration structure, and/or a degree of vibrational energy being transmitted through the anti-vibration structure (as previously described).

At 1810, a determination can be made regarding:

(a) a mass to be supported by the anti-vibration structure, and/or
(b) magnitude of at least one vibrational force transmitted across the anti-vibration structure resulting from forces generated during motion of a vehicle to which the anti-vibration structure is attached.

At 1820, as previously described, the anti-vibration structure can be formed with a kinematic structure located between a pair of base beams (e.g., connected to a vehicle floor) and a pair of upper beams (e.g., connected to a seat), wherein a tensioning force can be applied along a first axis of the kinematic structure, thereby by constraining motion of the kinematic structure along a second axis of motion orthogonal to the first axis. The tensioning force can be applied by one or more springs aligned along the first axis of the kinematic structure.

The applied tensioning force can be adjusted to attenuate vibrational motion across the kinematic structure, wherein the magnitude of the vibrational motion can be a function of (a) the mass being supported by the anti-vibration structure, and/or (b) the motion of the vehicle. In an embodiment, adjustment of the applied tensioning force can be achieved by increasing or reducing the extension of the at least one spring. In an embodiment, adjustment of the tensioning force can be performed electronically, e.g., by a motor winch attached to the at least one spring. In another embodiment, the tensioning force can be adjusted manually, e.g., by rotation of a thumbwheel attached to a winch which is further attached to the at least one spring. In another embodiment, the mechanism to adjust the winch position electronically and the mechanism to adjust the winch position manually (e.g., the thumbwheel) can be co-located, such that electronic and manual adjustment can be performed in combination as needed.

APPENDIX A $$\lambda_0 = 0. \quad \text{Eqn. B1}$$

$$\lambda_1 = \frac{\tan^2\alpha}{n^2}. \quad \text{Eqn. B2}$$

$$\lambda_2 = \frac{3\sin\alpha}{4n^3 l \cos^4(\alpha)}. \quad \text{Eqn. B3}$$

$$\lambda_3 = -\frac{4\cos^2(\alpha) - 5}{8n^4 l^2 \cos^6(\alpha)}. \quad \text{Eqn. B4}$$

$$\lambda_4 = -\frac{5(4\cos^2(\alpha) - 7)\sin(\alpha)}{64 l^3 n^5 \cos^8(\alpha)}. \quad \text{Eqn. B5}$$

$$\lambda_5 = \frac{24\cos^4(a) - 28\cos^2(a) + 63}{128 l^4 n^6 \cos^{10}(a)}. \quad \text{Eqn. B6}$$

$$\lambda_6 = \frac{\tan\alpha}{n}. \quad \text{Eqn. B7}$$

$$\lambda_7 = \frac{1}{2 ln^2 \cos^3(\alpha)}. \quad \text{Eqn. B8}$$

$$\lambda_8 = \frac{3\sin\alpha}{8 l^2 n^3 \cos^5(\alpha)}. \quad \text{Eqn. B9}$$

$$\lambda_9 = -\frac{4\cos^2(\alpha) - 5}{16 l^3 n^4 \cos^7(\alpha)}. \quad \text{Eqn. B10}$$

$$\lambda_{10} = -\frac{5(4\cos^2(\alpha) - 7)\sin(\alpha)}{128 l^4 n^5 \cos^9(\alpha)}. \quad \text{Eqn. B11}$$

$$\lambda_{11} = \frac{24\cos^4(\alpha) - 84\cos^2(\alpha) + 63}{256 l^5 n^6 \cos^{11}(\alpha)}. \quad \text{Eqn. B12}$$

APPENDIX B $$\frac{c\omega\lambda_6 + a^2 c\omega\lambda_8/4 + a^4 c\omega\lambda_{10}/8}{\omega^2 M} = \frac{z_0 \sin(\phi)}{a}. \quad \text{Eqn. C1}$$

$$\frac{\frac{3}{4}k\lambda_3 a^2 + \frac{5}{64}M 2 a^6 \omega^2 \varepsilon_{11}}{\omega^2 M} + \frac{\frac{5}{8}k\lambda_5 a^4 + k\lambda_1 - \omega^2 M}{\omega^2 M} = \frac{z_0 \cos(\phi)}{a}. \quad \text{Eqn. C2}$$

What is claimed is:

1. An anti-vibration system comprising:
a pair of base beams, wherein the base beams of the pair of base beams are aligned in a first plane;
a pair of upper beams, wherein the upper beams of the pair of upper beams are aligned in a second plane, and wherein the first plane and second plane are parallel, or substantially parallel;
a kinematic structure comprising beams and rods, wherein the kinematic structure is located between and connects the base beams to the upper beams, and wherein movement of the kinematic structure facilitates a first displacement of the upper beams along a first axis relative to a position of the base beams, wherein the movement of the kinematic structure that facilitates the first displacement of the upper beams is a first movement of the kinematic structure;
a tensioning device configured to apply tension to the kinematic structure along a second axis that is orthogonal, or substantially orthogonal, to the first axis to constrain a second displacement of the kinematic structure along the second axis, wherein the second displacement being constrained along the second axis constrains a third displacement of the kinematic structure along the first axis, and
a damping device configured to dampen a second movement of the kinematic structure along the second axis to dampen the third displacement of the kinematic structure along the first axis, wherein the damping device is co-located with the tensioning device.

2. The anti-vibration system of claim 1, wherein the first displacement of the upper beams along the first axis relative to the position of the base beams is at an initial distance responsive to an absence of vibrational energy or payload being applied to the anti-vibration system.

3. The anti-vibration system of claim 2, wherein the tensioning device comprises at least one spring.

4. The anti-vibration system of claim 3, wherein, in response to application of a compressive force to the kinematic structure in a first direction defined by the first axis, the at least one spring extends along the second axis, thereby constraining the third displacement of the kinematic structure along the first axis.

5. The anti-vibration system of claim 3, wherein, in response to a reduction of a downward force on the kinematic structure along the first axis, the damping device is configured to resist motion of the kinematic structure along the second axis resulting from relaxation of the at least one spring.

6. The anti-vibration system of claim 1, wherein the kinematic structure is configured to constrain motion of movable parts of the anti-vibration system to a single degree of freedom along the first axis.

7. The anti-vibration system of claim 1, wherein a relationship between a change in the third displacement along the first axis relative to the tension applied to the kinematic structure to constrain the second displacement of the kinematic structure in the second axis is a non-linear relationship.

8. The anti-vibration system of claim 1, wherein a stiffness of the kinematic structure increases non-linearly with an amount of the tension applied relative to the first displacement of the upper beams along the first axis relative to the position of the base beams.

9. The anti-vibration system of claim 1, wherein the base beams comprise first attachment elements to secure the base beams to a floor of a vehicle and the upper beams comprise second attachment elements to secure the upper beams to a bottom portion of a seat of the vehicle.

10. A method, comprising:
receiving a force applying a tension to a kinematic lattice along a first axis constraining a movement of the kinematic lattice, wherein a lower portion of the kinematic lattice is attachable to a floor of a vehicle and an upper portion of the kinematic lattice is attachable to a seat of the vehicle, wherein, during motion of the vehicle, vibrational energy resulting from the motion of the vehicle causes the seat to move along a second axis relative to the floor, and wherein the second axis is orthogonal, or substantially orthogonal, to the first axis, wherein the receiving of the force applying the tension comprises receiving the force by applying the tension to at least one spring of the kinematic lattice;

responsive to the constraining of the movement of the kinematic lattice along the first axis, attenuating a vibrational motion of the kinematic lattice and the seat along the second axis; and applying a damper in series with the at least one spring, wherein the damper is configured to dissipate energy released by the at least one spring during extension or contraction of the at least one spring along the first axis.

11. The method of claim 10, wherein a first amount of the constraining of the movement of the kinematic lattice along the first axis relative to a second amount of the attenuating of the vibrational motion of the kinematic lattice and the seat along the second axis is defined by a non-linear relationship.

12. The method of claim 11, wherein the non-linear relationship results from the least one spring of the kinematic lattice creates a non-linear damping of the vibrational motion of the kinematic lattice and the seat along the second axis.

13. The method of claim 10, further comprising adjusting an amount of the tension applied to the kinematic lattice to compensate for at least one of a seat payload or the vibrational energy generated from the motion of the vehicle.

14. A suspension system, comprising:
a base platen configured to attach to a first part of a vehicle;
an upper platen configured to attach to a second part of the vehicle above the first part;
a kinematic structure located between and connecting the base platen to the upper platen, wherein the kinematic structure limits displacement of the upper platen to a single degree of freedom relative to the base platen, and the displacement is along a first axis relative a first position of the base platen and a second position of the upper platen, wherein the movement of the kinematic structure limits displacement of the upper platen relative to the base platen is a first movement of the kinematic structure;
a tensioning component coupled to the kinematic structure and configured to apply tension to the kinematic structure to constrain the displacement of the upper platen relative to the base platen, wherein the tensioning component is configured to constrain a second displacement of the kinematic structure along a second axis that is orthogonal to the first axis, wherein the second displacement being constrained along the second axis constrains a third displacement of the kinematic structure along the first axis; and a damper component configured to dissipate energy released by the tensioning component during the displacement of the base platen, wherein the energy is dissipated in a second movement of the kinematic structure along the second axis to dampen the third displacement of the kinematic structure along the first axis, wherein the damping device is co-located with the tensioning device.

15. The suspension system of claim 14, wherein a change in tension applied to the kinematic structure by the tensioning component results in a corresponding non-linear change to an amount of the displacement of the base platen.

16. The suspension system of claim 14, wherein the damper component and the tensioner component cooperate to cause the kinematic structure to vary non-linearly in stiffness from the upper platen to the base platen.

17. The suspension system of claim 14, wherein the first displacement of the upper platen along the first axis relative to the position of the base platen is at an initial distance responsive to an absence of vibrational energy or payload being applied to the suspension system.

18. The suspension system of claim 17, wherein the tensioning device comprises at least one spring.

19. The suspension system of claim 18, wherein, in response to application of a compressive force to the kinematic structure in a first direction defined by the first axis, the at least one spring extends along the second axis, thereby constraining the third displacement of the kinematic structure along the first axis.

20. The suspension system of claim 18, wherein, in response to a reduction of a downward force on the kinematic structure along the first axis, the damping device is configured to resist motion of the kinematic structure along the second axis resulting from relaxation of the at least one spring.

* * * * *